United States Patent [19]
Kai

[11] Patent Number: 5,495,313
[45] Date of Patent: Feb. 27, 1996

[54] LIGHT METERING DEVICE FOR CAMERA

[75] Inventor: Tadao Kai, Kawasaki, Japan

[73] Assignee: Nikon Corporation, Tokyo, Japan

[21] Appl. No.: 461,540

[22] Filed: Jun. 5, 1995

Related U.S. Application Data

[63] Continuation of Ser. No. 329,375, Oct. 25, 1994, abandoned, which is a continuation of Ser. No. 240,400, May 10, 1994, abandoned, which is a continuation of Ser. No. 939,686, Sep. 2, 1992, abandoned.

[30] Foreign Application Priority Data

Sep. 4, 1991 [JP] Japan ..................... 3-224005

[51] Int. Cl.⁶ .............................. G03B 13/36; G03B 7/08
[52] U.S. Cl. ............................. 354/408; 354/432
[58] Field of Search ..................... 354/402, 403, 354/406, 407, 408, 429, 432, 433

[56] References Cited

U.S. PATENT DOCUMENTS

| | | | |
|---|---|---|---|
| 4,274,721 | 6/1981 | Fukuhara et al. | 354/432 |
| 4,561,749 | 12/1985 | Utagawa | 354/406 |
| 4,951,080 | 8/1990 | Sakamoto et al. | 354/432 |
| 5,126,777 | 6/1992 | Akashi et al. | 354/408 X |
| 5,168,299 | 12/1992 | Taniguchi et al. | 354/407 |
| 5,239,333 | 8/1993 | Takagi | 354/432 X |

FOREIGN PATENT DOCUMENTS

| | | |
|---|---|---|
| 60-37513 | 2/1985 | Japan . |
| 62-259022 | 1/1987 | Japan . |
| 62-19824 | 1/1987 | Japan . |

*Primary Examiner*—Russell E. Adams
*Attorney, Agent, or Firm*—Shapiro and Shapiro

[57] ABSTRACT

In a light metering device, first luminance information is calculated from the output of a first photoelectric converter which photoelectrically converts the light beam from a first area of the object field. After a predetermined time from the photoelectric conversion, second luminance information is calculated from the output of a second photoelectric converter which photoelectrically converts the light beam from a second area, having an overlapping area with the first area. A first overlapping area luminance, in the overlapping area of the first photoelectric converter, and a second overlapping area luminance, in the overlapping area of the second photoelectric converter are determined, and the light values in the first and second areas are calculated from the first and second luminance information and the first and second overlapping area luminance.

61 Claims, 12 Drawing Sheets

FIELD TO BE PHOTOGRAPHED

LIGHT METERING DEVICE FOR CAMERA

This is a continuation of application Ser. No. 08/329,375 filed Oct. 25, 1994, which is a continuation of application Ser. No. 08/240,400 filed May 10, 1994, which is a continuation of application Ser. No. 07/939,686 filed Sep. 2, 1992, all now abandoned.

BACKGROUND OF THE INVENTION

1. Field of the Invention

The present invention relates to a light metering device adapted for use in an automatic focusing (hereinafter abbreviated as AF) camera or the like and obtaining a metered light value by the output of an AF photosensor provided with photoelectric sensor arrays of which photoelectric conversion areas in the image frame partially overlap (for example photosensor arrays with a cross-shaped photoelectric conversion area).

2. Related Background Art

In case of obtaining the measured light value on the luminance of object, from the output of a focus state detection device having a charge-accumulating photoelectric conversion device normally employed in the AF cameras, it is already known that the accuracy of light metering is deteriorated under a light source involving flicker such as a fluorescent lamp, because the calculated light value is aberrated from the average object luminance, depending on whether the charge accumulation is conducted at the peaks or bottoms of the flicker.

For resolving this drawback, the Japanese Patent Laid-open Applications Nos. 62-19824 and 62- 259022 disclose a method of employing the average of plural charge accumulations, thereby avoiding the influence of fluctuation in the measured value in a single light metering operation and obtaining an averaged (accurate) measured value on the object luminance.

However, each light integrating operation requires a time for analog-digital (A/D) conversion and focus state calculation in addition to the charge accumulation time and the charge transfer time, repetition of plural integrations (four integrations in the description in the Japanese Patent Laid-open Application No. 62-259022) after the start of light metering, for the purpose of improving the accuracy of light metering. This detrimentally affects the rapid phototaking ability of the camera employing such device.

Thus, an increase in the number of integrations to be averaged, for improving the stability, deteriorates the response. Also a mere increase in the number of light metering cycles does not necessarily lead to an exact measured value, if the timing of light metering is eventually synchronized with the cycle of flicker.

Besides, the plural light metering operations and A/D conversions in a same photosensor array are an unnecessary process and have to be avoided.

SUMMARY OF THE INVENTION

In consideration of the foregoing, the object of the present invention is to provide a light metering device for use in a camera, capable of promptly providing the light-metered value of a high accuracy, even under a flickering light source such as a fluorescent lamp.

The light metering device of the present invention comprises first photoelectric conversion means for effecting photoelectric conversion on the light beam from a first area of the object field; second photoelectric conversion means for effecting photoelectric conversion on the light beam from a second area, including an overlapping area with the first area, of the object field; first luminance calculation means for calculating first luminance information from the output of the first photoelectric conversion means; time setting means for setting a predetermined time from the start of photoelectric conversion by the first photoelectric conversion means to the start of that by the second photoelectric conversion means; second luminance calculation means for calculating second luminance information from the output of the second photoelectric conversion means after the lapse of the predetermined time set by the time setting means; luminance calculation means for calculating a first overlapping area luminance in the overlapping area in the first photoelectric conversion means and a second overlapping area luminance in the overlapping area in the second photoelectric conversion means; and averaged light calculation means for calculating the measured light in the first and second areas, utilizing the first and second luminance information and the first and second overlapping area luminances.

Also the light metering device of the present invention comprises charge-accumulating photoelectric conversion means for effecting photoelectric conversion in a focus state detection area and a light metering area in the object field; luminance calculation means for calculating luminance information from the output of the charge-accumulating photoelectric conversion means; accumulating time control means for controlling the charge-accumulating time of the photoelectric conversion means; light-metering area setting means for setting the light metering area in a limited light metering area narrower than the focus state detection area; and discrimination means for discriminating a shorter one of a first charge-accumulating time set by the accumulating time control means for obtaining optimum luminance information from the focus state detection area and a second charge-accumulating time set by the accumulating time control means for obtaining optimum luminance information from the limited light metering area, wherein the metered light value for the entire charge-accumulating photoelectric conversion means is obtained with the shorter one of the first and second charge accumulating times.

The present invention is featured by obtaining the luminance outputs from the overlapping area of different photosensor arrays at different timings in consideration of the flickering cycles, thereby enabling to promptly obtain the metered light value of a high precision in efficient manner and over the entire focus detection area, without the repetition of the light metering operation in the same photosensor array and even under a flickering light source such as a fluorescent lamp.

In an aspect of the present invention, the photoelectric conversion in the second photoelectric conversion means is started after the lapse of a predetermined time from the start of that in the first photoelectric conversion means, and the luminance calculation means averages the luminance information in the overlapping area of the first photoelectric conversion means and that in the overlapping area of the second photoelectric conversion means, thereby calculating the averaged, namely exact, luminance information in the overlapping area.

Also outside the overlapping area, the averaged light calculation means calculates the averaged (exact) metered light value of the first and second photoelectric conversion means, without the influence of the flickering light source, by utilizing the ratio of the luminance of the overlapping area obtained at the photoelectric conversion to the exact luminance of the overlapping area determined as explained above.

Consequently the metered light value of a high precision can be promptly obtained over the entire focus detecting area, without unnecessary operations such as the repeated photoelectric conversions in a same photosensor array.

In another aspect of the device of the present invention, the average light value can be obtained over the entire light metering area, even when the focus detecting area is shaped as a double cross, instead of a single cross.

It is therefore rendered possible to promptly obtain the light value of a high precision over the entire focus detecting area, without unnecessary operations such as the repeated photoelectric conversions in a same photosensor array.

In still another aspect of the device of the present invention, the order of light metering is modified in case of a double cross-shaped light metering area as in the above-mentioned device. Consequently the averaged light value can be obtained from the entire light metering area, with an increased freedom in the light metering method.

In the above-mentioned devices, there may be provided flicker detection means for detecting the cycle time t of the flickering, and the predetermined time may be so automatically determined as to start the photoelectric conversion in the second photoelectric conversion means after the lapse of t/2 from the start of photoelectric conversion in the first photoelectric conversion means. Since the flickering cycle time t of the fluorescent lamp is within a certain range, the above-mentioned devices may be provided with cycle time memory means for storing the predetermined time in advance, in order to reduce the cost of the device. Besides, manual time setting means may be provided for enabling the photographer to set a special flickering cycle time.

A still further aspect of the device of the present invention is designed for a low object luminance, in combination with the charge-accumulating photoelectric conversion means. The charge accumulation time of the conversion means becomes longer under a low object luminance. Consequently there are provided light metering method switching means and accumulation time setting means for setting a predetermined accumulating time, and, if the charge accumulating time of either photoelectric conversion means becomes longer than the predetermined charge accumulating time, the aforementioned averaged light calculation means is deactivated and all the photoelectric conversion means are simultaneously controlled with the aforementioned predetermined charge accumulation time, thereby obtaining accurate light value in prompt manner.

In case the focus state detection and the light metering are conducted in same charge-accumulating photoelectric conversion means, there is sometimes provided light metering area setting means for limiting the light metering area. In such case, the charge accumulating time for the limited light metering area may be different from that for the focus state detection. Still another aspect of the present invention provides a device capable of attaining an appropriate detecting accuracy also in such case.

DETAILED DESCRIPTION OF THE PREFERRED EMBODIMENTS

Figure 13:
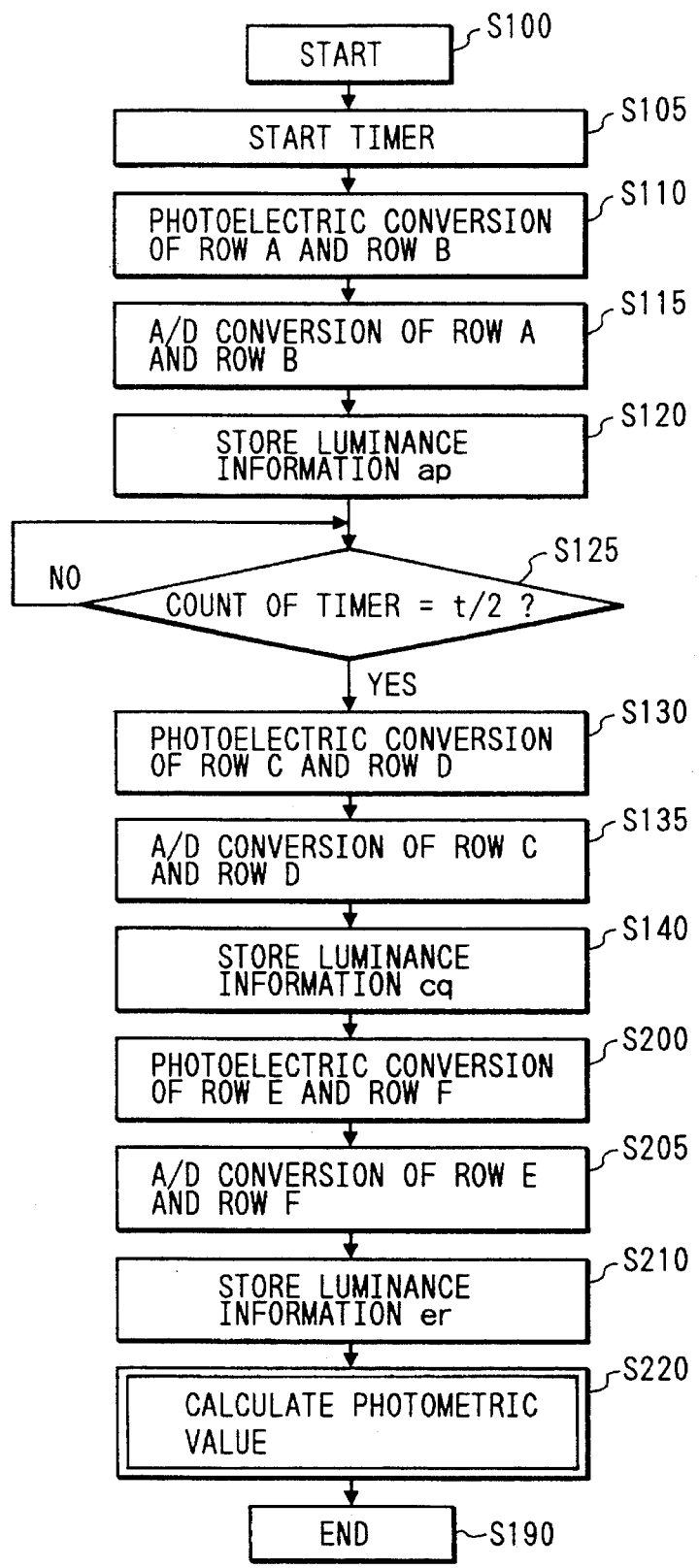
FIGS. 13 and 14 are flow charts showing the algorithm of light value calculation in the second embodiment.
Figure 14:
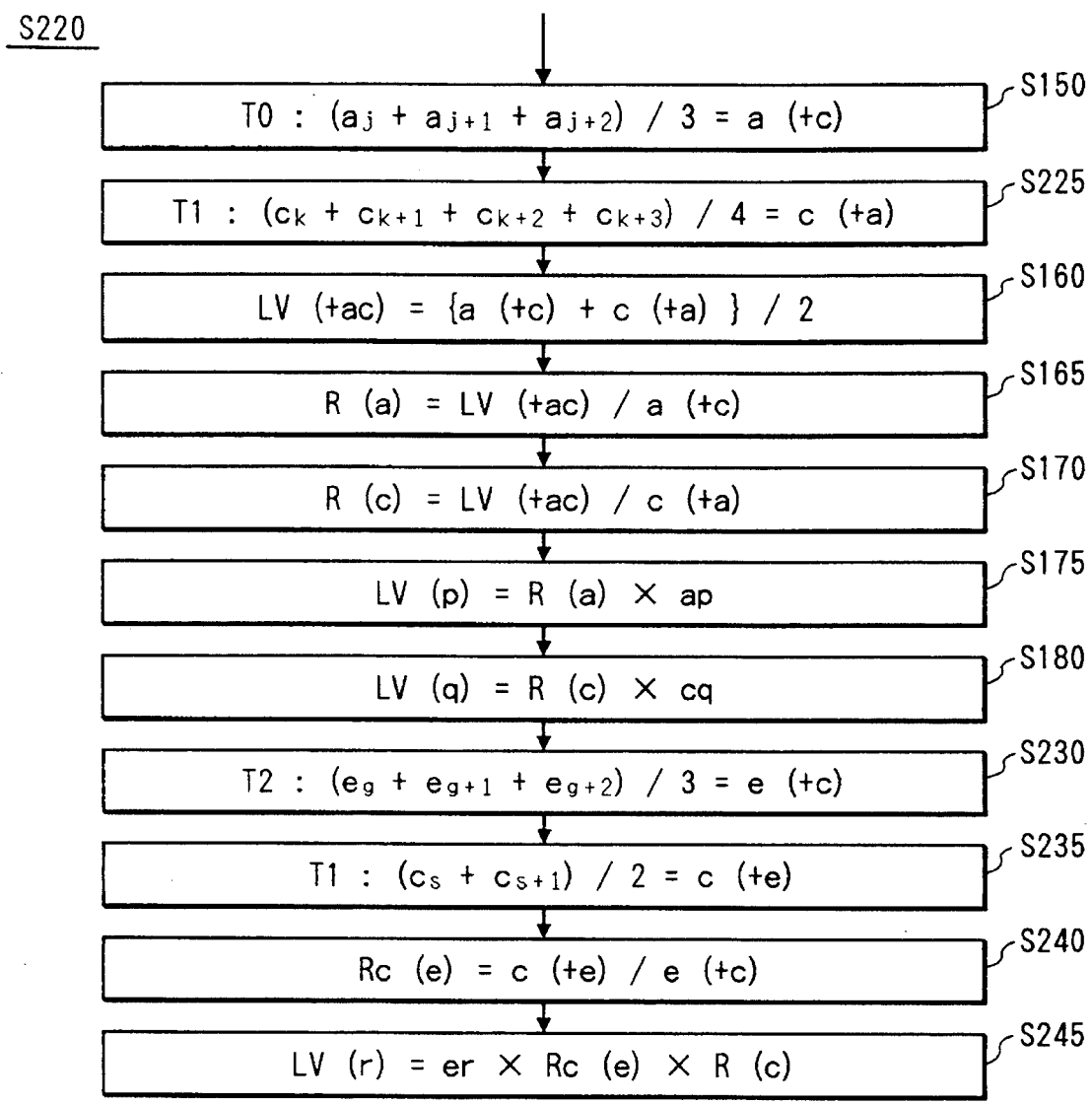
Figure 15:
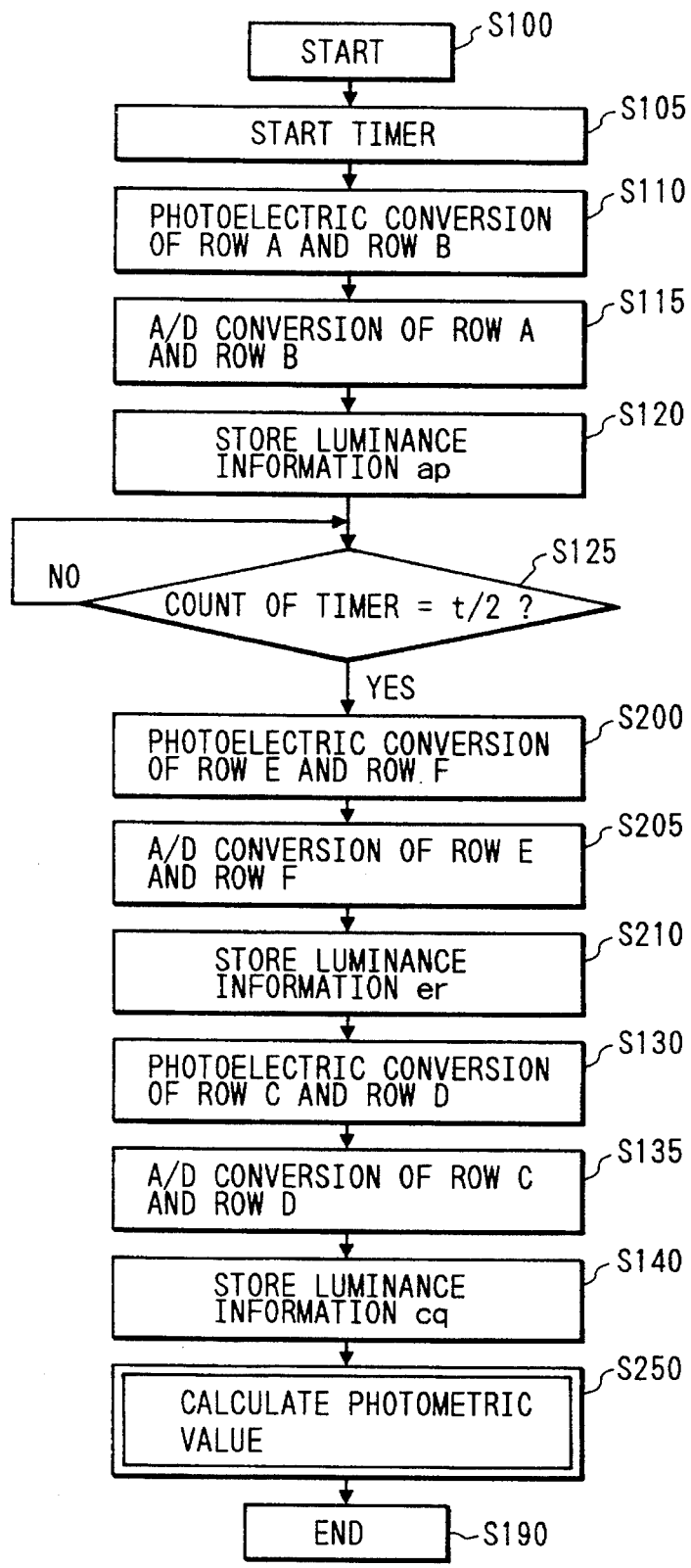
FIGS. 15 and 16 are flow charts showing the algorithm of light value calculation in a third embodiment.
Figure 16:
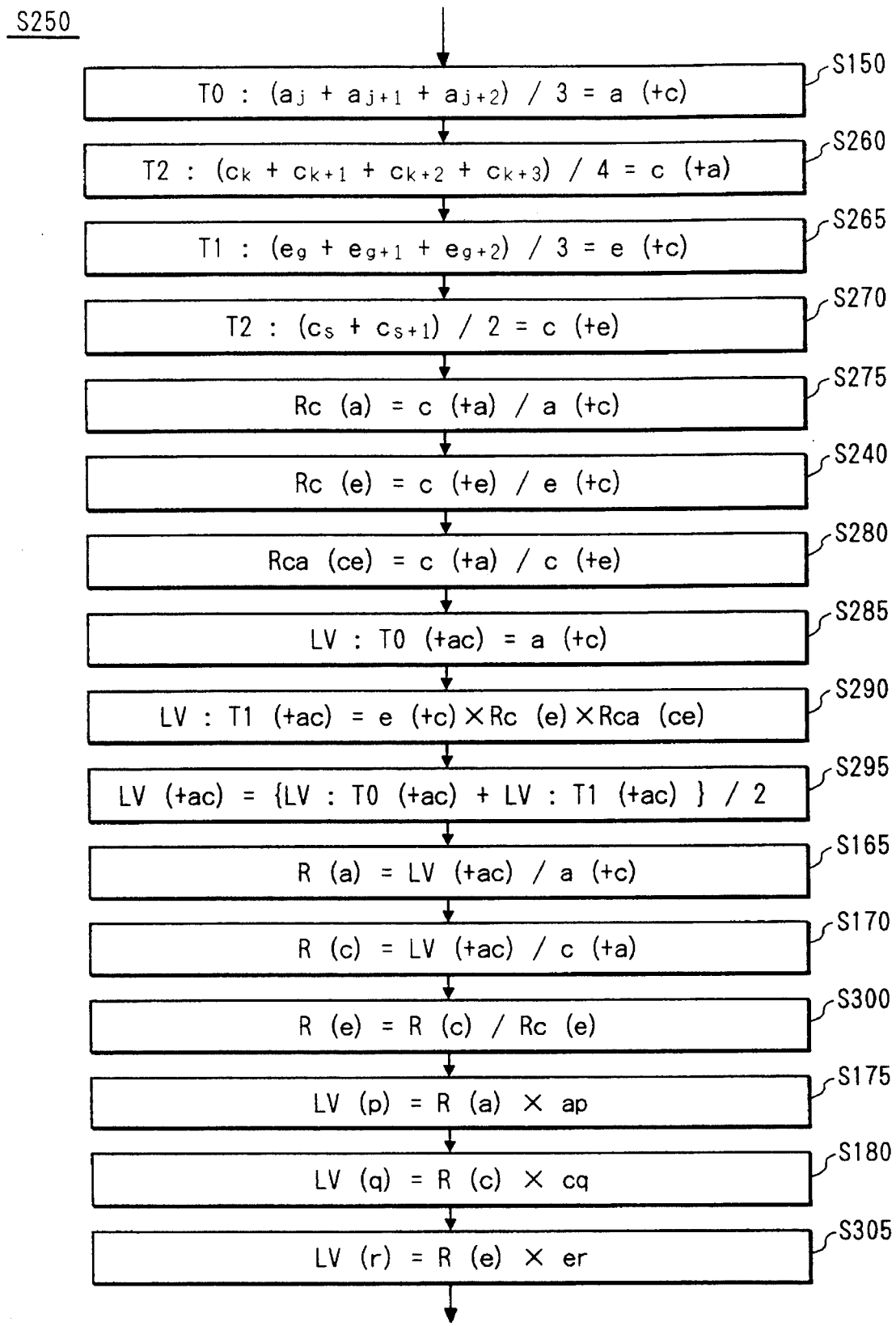

FIGS. 1 to 9 illustrate a first embodiment of the light metering device of the present invention, for use in a camera; while FIGS. 10 to 14 illustrate a second embodiment of said device; and FIGS. 15 and 16 show a third embodiment of said device.

Figure 1:
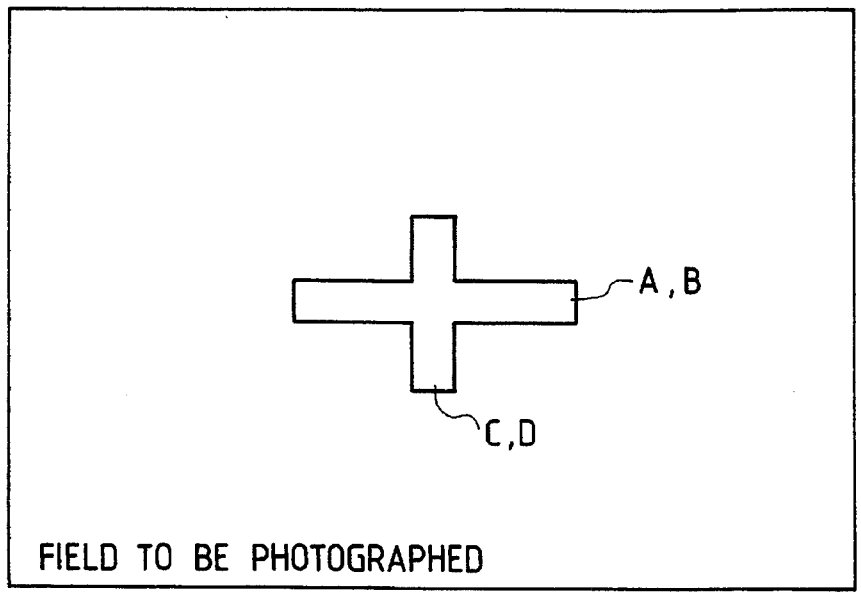
FIG. 1 is a view showing a light metering area in a first embodiment.

The first embodiment employs a cross-shaped light metering area as shown in FIG. 1, and the second and third embodiments are different therefrom in employing a double cross-shaped light metering area. The second and third embodiments are mutually different in the sequence of light value calculation.

[1st embodiment]

At first there will be explained the light metering procedure of said first embodiment.

FIG. 1 illustrates the light metering area, having a cross-shaped detection area in the object field, of the light metering device of the present invention capable also of focus state detection. The detection areas in the horizontal direction of the cross shape shall be called rows A and B, while those in the vertical direction shall be called rows C and D.

Figure 2:
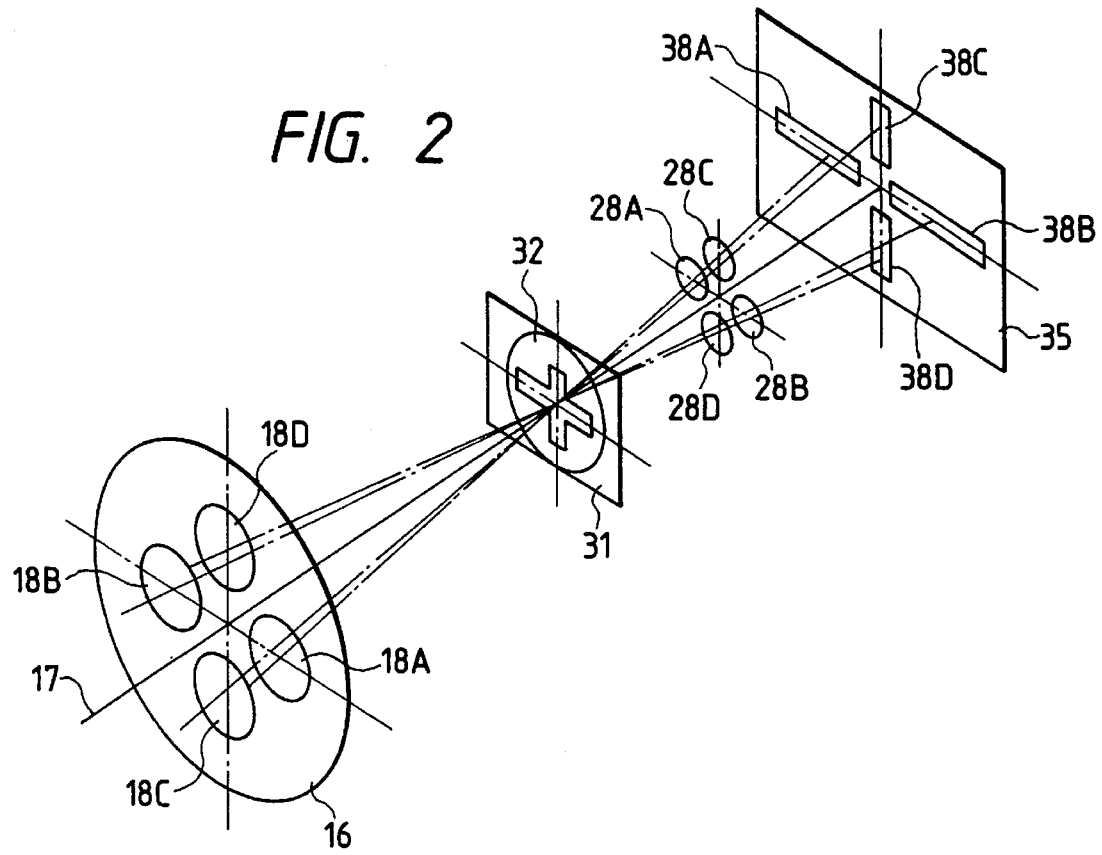
FIG. 2 is a schematic view showing the configuration of the light metering device of the first embodiment.

FIG. 2 illustrates an example of the configuration of the light metering device of the present invention, capable also of focus state detection (auto focusing-auto exposure (AFAE) module). The AFAE module is composed of a focus detecting optical system 25, consisting of a field mask 31, a field lens 32 and two pairs of reimaging lenses 28A, 28B and 28C, 28D; and photoelectric conversion means 35 consisting of two pairs of photosensor arrays 38A, 38B and 38C, 38D. In the above-mentioned configuration, the light beams passing through two pairs of areas 18A, 18B and 18C, 18D contained in the exit pupil 16 of a phototaking lens 11 (see FIG. 9) and symmetrical to the optical axis 17 form a primary image in the vicinity of the field mask 31 having an aperture corresponding to the entire focus detecting area shown in FIG. 1. A part of said primary image formed on the aperture of the field mask 31 is re-focused, by the field lens 32 and two pairs of re-imaging lenses 28A, 28B and 28C, 28D, as two pairs of secondary images on the two pairs of photosensor arrays 38A, 38B; 38C, 38D constituting the photoelectric conversion means.

Figure 3:
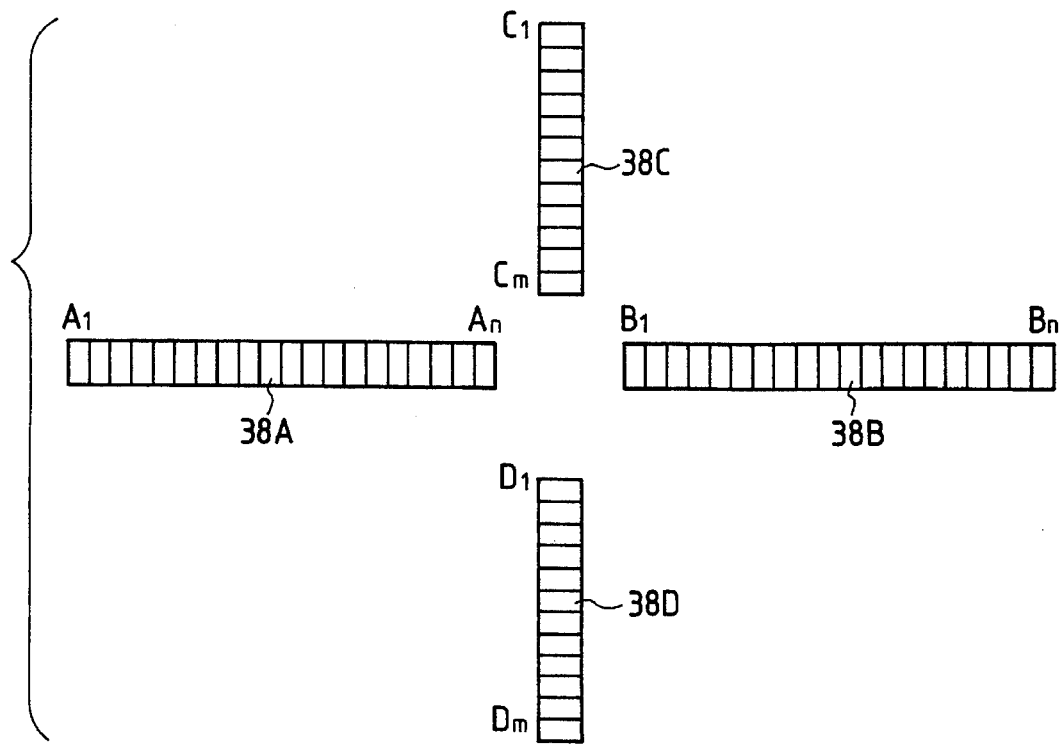
FIG. 3 is a view showing the arrangement of photosensor elements of the photoelectric conversion means in the first embodiment.

FIG. 3 shows the arrangement of the photosensor arrays on the photoelectric conversion means 35. The photosensor arrays 38A, 38B are composed of n photosensor elements $A_p$, $B_p$ (p=1–n) respectively, and are so positioned that the corresponding photosensor elements ($A_1$ and $B_1$, $A_2$ and $B_2$, ...) generate mutually equal outputs when the primary image is positioned on the film plane. The arrays 38C, 38D are also composed, similarly, of m photosensor elements $C_q$, $D_q$ (q=1–m) respectively. The photosensor elements constituting the photosensor arrays 38A, 38B; 38C, 38D are composed of charge-coupled devices (CCD) such as photodiodes, and can provide outputs of an appropriate level by charge accumulation for a suitable time, under control by accumulation time control means.

In consideration of the influence of the flickering light source, the charge accumulation for focus state detection has to be conducted at the same time in the paired photosensor arrays A and B (or C and D), but need not necessarily be at the same time for the arrays A (or B) and C (or D).

The luminance information is calculated from the output of the photosensor elements in the following manner, for example in case of the elements $A_p$:

$$a_p = CS(A) \times O(A_p)/T(A) \qquad (1)$$

wherein:

$a_p$: luminance information

CS(A): constant $O(A_p)$: photosensor element output (A/D converted)

T(A): charge accumulation time.

The luminance information, thus calculated corresponding the photosensor elements $A_p$, $B_p$; $C_p$, $D_p$ shall be respectively represented by $a_p$, $b_p$ (p=1–n), and $c_q$, $d_q$ (q=1–m).

In case of zero defocus, the luminance information $a_p$ and $b_p$ are same, because they are obtained by focusing the light beams, coming from a same object portion and passing through different pupil areas of the phototaking lens 11. Consequently the luminance information of the object may be represented by $(a_p+b_p)/2$, or $a_p$ or $b_p$. Same applies to the luminance information $c_q$, $d_q$. Therefore, $a_p$ and $c_q$ shall be employed as the luminance information in the following explanation.

When the object is illuminated by a flickering light source, the object luminance varies in synchronization with the flickering cycle of the light source, so that the luminance information $a_p$ or $c_p$ also varies and does not necessarily represent the exact object luminance. Consequently the metered light value obtained by a single photoelectric conversion cannot, in general, be considered as an exact (averaged) value.

Figure 4:
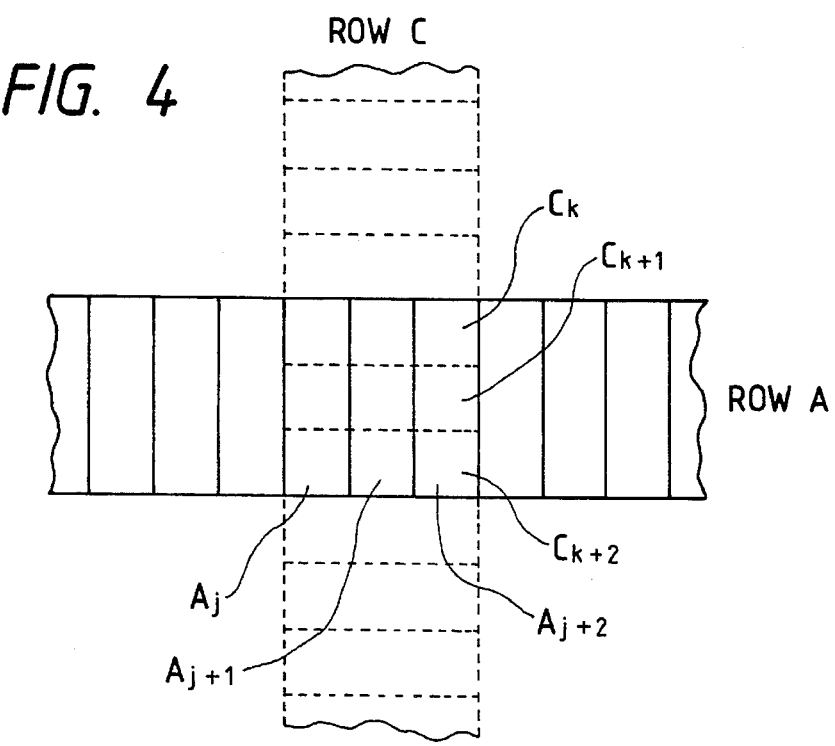
FIG. 4 is a partial magnified view of an overlapping light metering area in the photosensor arrays of the first embodiment.

If we look at the crossing point of the object areas measured photosensor arrays $A_1-A_n$ and $C_1-C_m$ shown in FIG. 4, the areas $A_j-A_{j+2}$ and $C_k-C_{k+2}$ measure a same object area. Consequently, if the light illuminating the object is constant, the sum of luminance information $a_j-a_{j+2}$ becomes equal to that $c_k-c_{k+2}$ even if the timing of measurement is different, so that following relations (2) to (4) stand:

$$(a_j+a_{j+1}+a_{j+2})/3 = a(+c) \qquad (2)$$

$$(C_k+C_{k+1}c_{k+2})/3 = c(+a) \qquad (3)$$

$$a(+c) = c(+a) \qquad (4)$$

wherein a(+c) represents the luminance information of the row A in the overlapping area with the row C, and c(+a) is the luminance information of the row C in the overlapping area with the row A.

Figure 5:
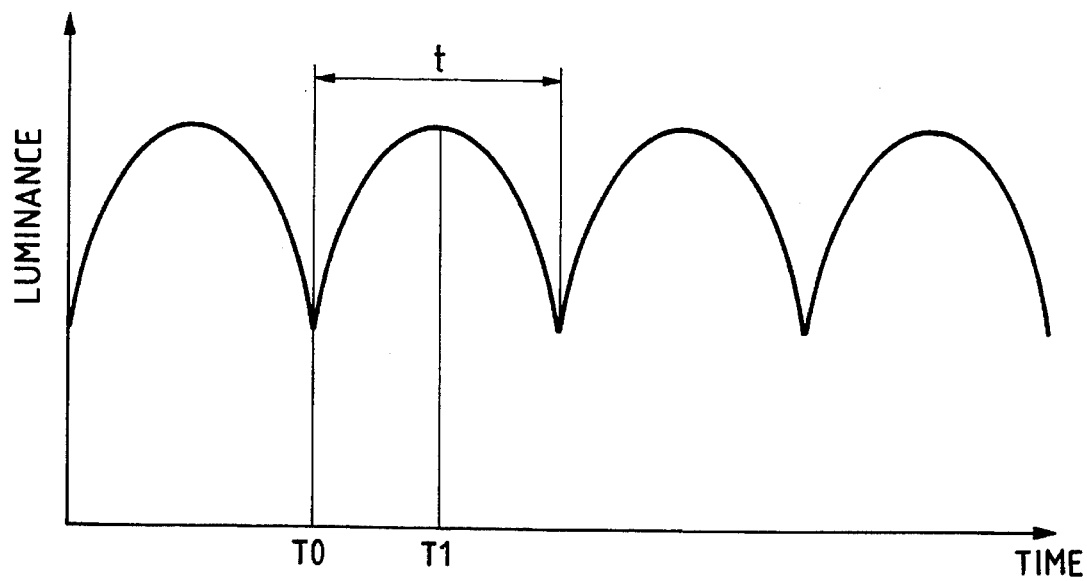
FIG. 5 is a chart showing the timings (T0, T1) of photoelectric conversions in the first embodiment.

However, if the object is illuminated by a flickering light source, the equation (4) does not stand in general, because the object luminance varies in synchronization with the flickering cycle of the light source. More specifically this is because the timing of photoelectric conversion for a(+c) (initial photoelectric conversion at T0) is different from that for c(+a) (next photoelectric conversion at T1). FIG. 5 shows the object luminance fluctuating in synchronization with the flickering cycles.

It is assumed that the time required in the photoelectric conversion of the present device, or the charge accumulation time of the photosensor elements, is shorter than the flickering cycle time of the light source, and the above-mentioned T0, T1 are represented by the starting time of charge accumulation.

The object luminance becomes periodically higher and lower, in synchronization with the flickering light source (under ordinary fluorescent lamp illumination, the difference between the highest and lowest luminances being considered about 1 EV), but the average of the object luminance at the photoelectric conversion (TO) of the row A and that at a time (T1) after a half of the flickering cycle time t (or after an odd multiple of t) from T0, can be regarded as the average luminance of the object, regardless of the timing of photoelectric conversion and the phase conditions of the flickering cycle.

The flickering cycle t can be detected by flickering cycle detection means, which detects the periodical variation (normally a cycle time of 100 msec to 1 msec) of the light intensity from the object.

Otherwise the following method may be employed as an alternative. The power supply frequency is 50 or 60 Hz in various countries, and the frequency of luminance variation of the flickering light source, such as a fluorescent lamp, is twice of the above-mentioned power supply frequency. Consequently, the flickering light sources in various countries show luminance variation at a frequency of 100 or 120 Hz. Thus the flickering cycle time is 10.0 or 8.33 msec., and an intermediate value 9.2 msec. (t/2 being 4.6 msec.) may be employed for obtaining a practical precision of measurement in a simpler manner and memorized in advance in memory means provided in the light metering device of the present invention.

Figure 6:
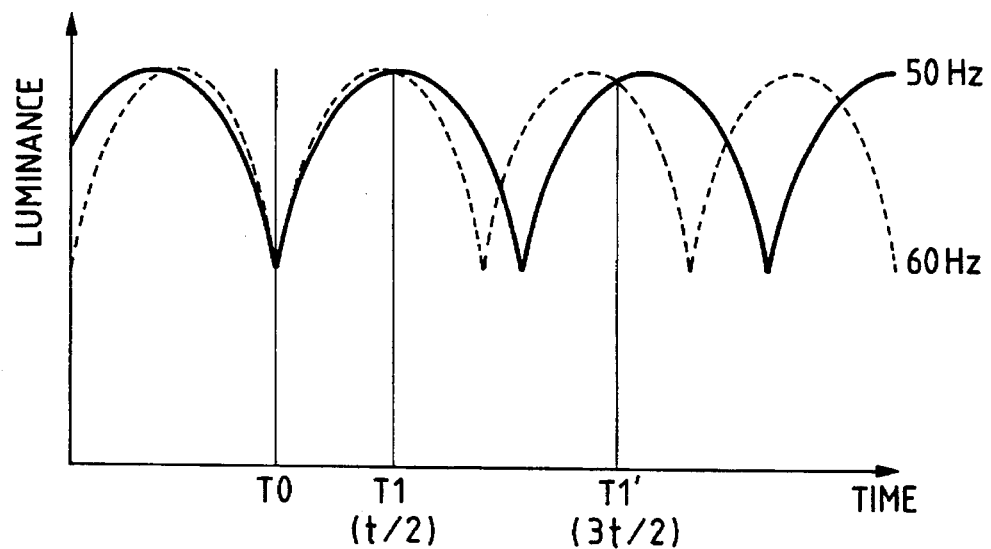
FIG. 6 is a chart showing the flickering cycle time of 50 and 60 Hz and timings T0, T1, T1' of photoelectric conversions.

FIG. 6 shows the flickering cycles and the timing of photoelectric conversion at the power supply frequencies of 50 and 60 Hz. A solid line and a broken line respectively represent the luminance variation at 50 and 60 Hz. From T0, T1 corresponds to 4.6 msec., and T1' corresponds to 13.8 msec.

It is to be noted, however, that said 4.6 msec. corresponding to t/2 is taken as average for the power supply frequencies of 50 and 60 Hz. Therefore, multiplication of a large odd number is undesirable because there will result a significant aberration from the actual luminance variation cycle of the flickering light source.

Consequently 4.6 msec is most desirable, and 13.8 msec. obtained by multiplication of 3, is next desirable. Therefore, in consideration of the charge accumulation time for light metering and the time required for subsequent light metering operation, 4.6 msec. is selected if this is possible, and, if this is not possible, 13.8 msec. is selected.

The above-mentioned 4.6 msec. or 13.8 msec. is naturally subject to a certain variation, in consideration of the actual device operation. (Based on FIG. 6, the tolerable range for T1 is about 3.6–5.4 msec., and that for T1' is about 12.8–14.6 msec.)

Also in case the photographer can identify the flickering cycle time of the light source illuminating the object, the light metering device of the present invention may be provided with manual time setting means for enabling the photographer to manually set the flickering cycle time. Such configuration will allow to handle a special flickering light source.

After the photoelectric conversion of the row A at T0, the photoelectric conversion of the row C is conducted at the lapse of a half of the flickering cycle time (T1=T0+t/2), and the luminances, a(+c), c(+a) are calculated from the luminance information $a_p$, $c_q$. Then the measured light value in the crossing area shown in FIG. 2 can be obtained from the following equation:

$$LV(+ac)=\{a(+c)+c(+a)\}/2 \quad (5)$$

wherein LV(+ac) is the average (namely exact) light value in said crossing area.

Following relations stand for LV(+ac) determined by the equation (5), a(+c) and c(+a):

$$R(a)=LV(+ac)/a(+c) \quad (6)$$

$$R(c)=LV(+ac)/c(+a) \quad (7)$$

wherein R(a) and R(c) are coefficients for determining exact light value from the luminance information $a_p$, and $c_q$. Thus:

$$LV(p)=a_p \times R(a) \quad (8)$$

$$LV(q)=c_q \times R(c) \quad (9)$$

wherein LV(p) and LV(q) are exact (average) measured light value in the photoelectric conversion areas of the photosensor elements $A_p$, $C_q$.

Thus the calculation of LV(p), LV(q) allows to determine the exact (average) light values in the photoelectric conversion areas of the photosensor elements $A_p$, $C_q$. It is therefore possible to obtain exact light values outside the area $A_j$–$A_{j+2}$, namely in the photosensor elements $A_1$–$A_{j-1}$ and $A_{j+3}$–$A_n$. Same applies also to the row C.

Figure 7:
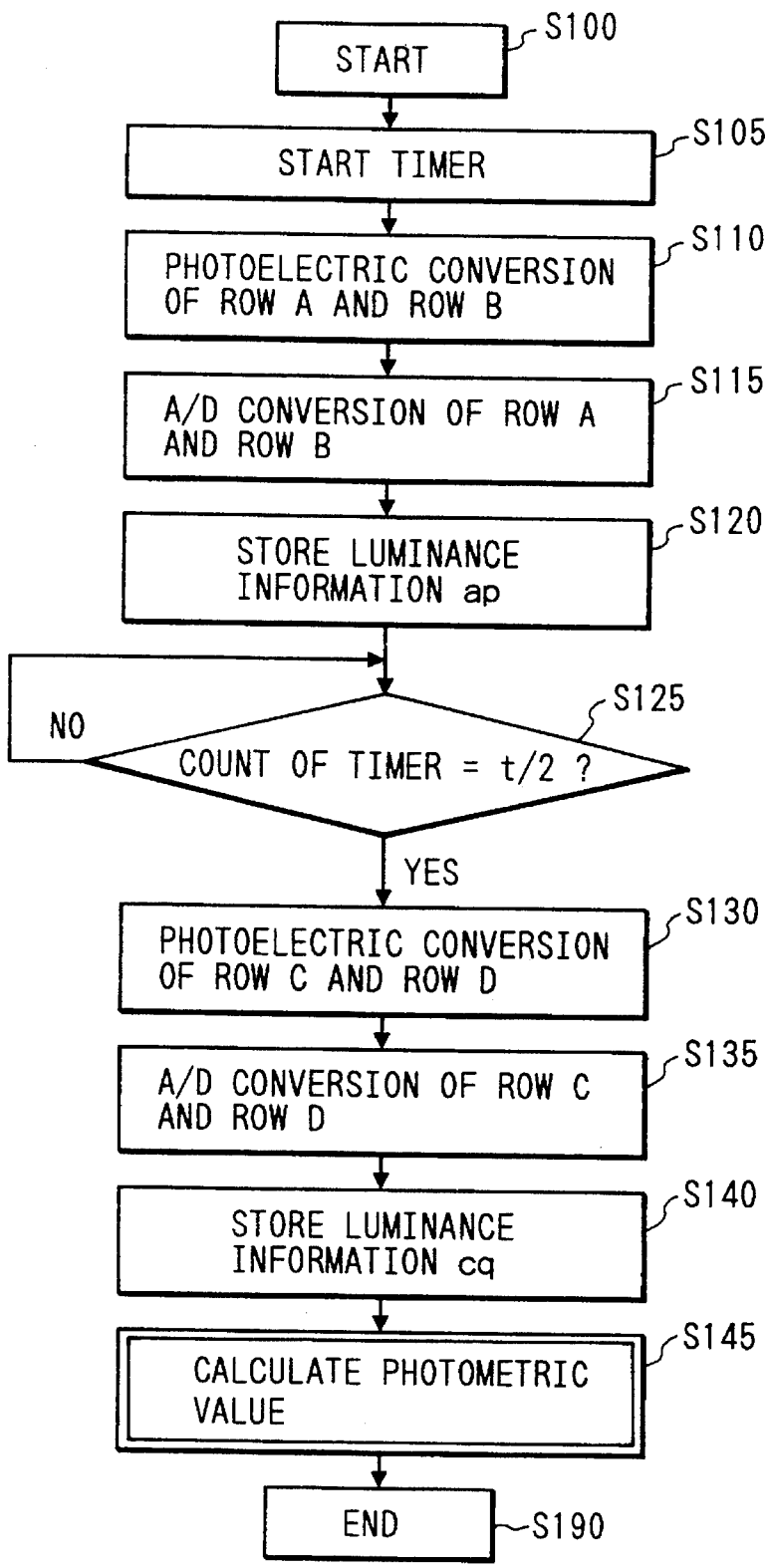
FIGS. 7 and 8 are flow charts showing the algorithm of metered light value calculation in the first embodiment.
Figure 8:
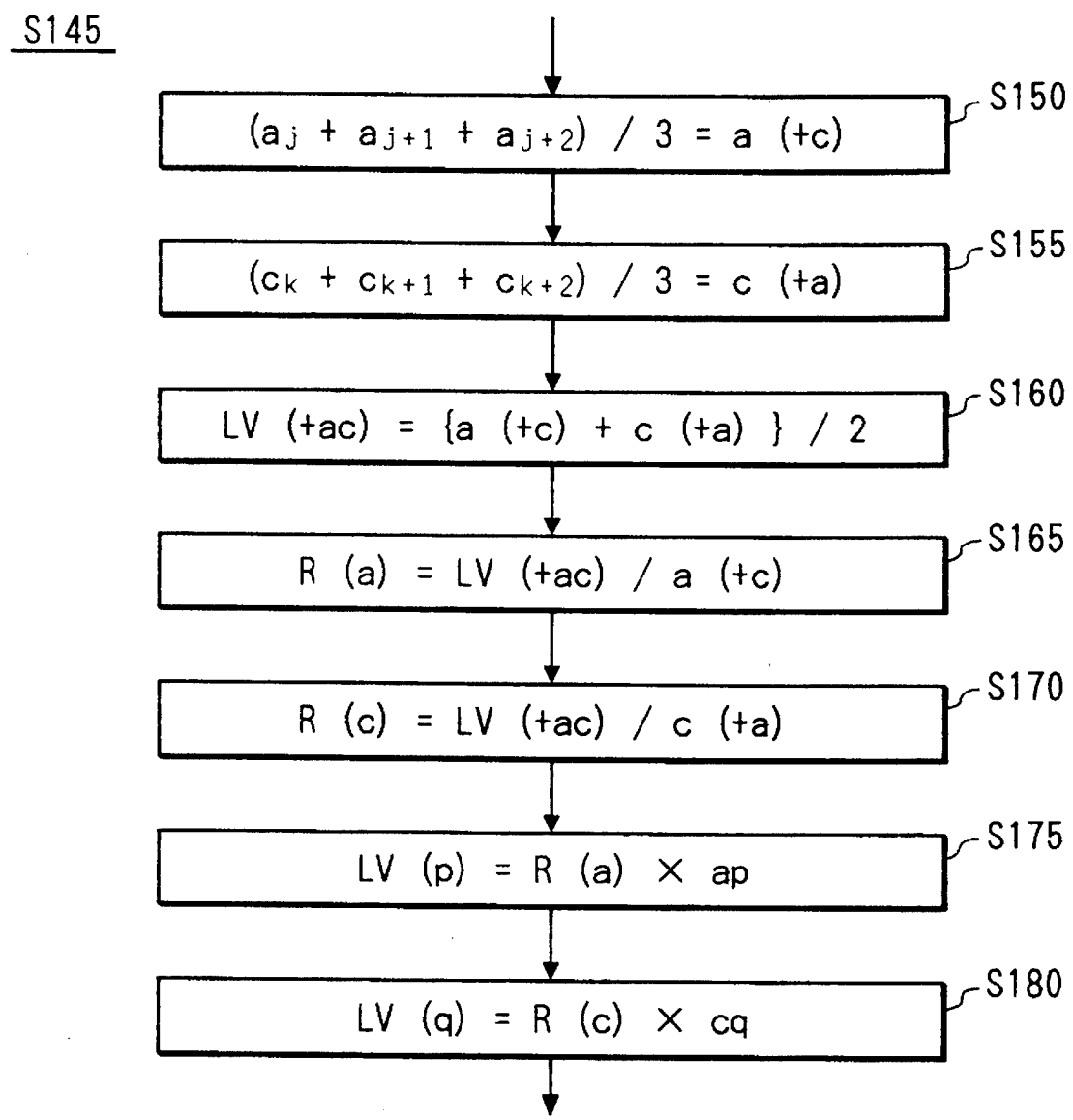

FIGS. 7 and 8 are flow charts showing a practical algorithm, employing the above-explained algorithm for photoelectric conversion and light value calculation:

S100:
Sequence starts from an arbitrary time T0 in the drive of the light metering device;

S105:
Activates a timer for controlling the delay time to the start of charge accumulation in the photosensor arrays C, D;

S110:
Start photoelectric conversion (charge accumulation of the photosensor arrays A, B;

S115:
Executes successive A/D conversion of the outputs of the arrays A, B;

S120:
Memorizes the luminance information obtained by processing the A/D converted values (though the flow for light metering requires the storage of $a_p$ values, the $b_p$ values are also stored in practice since the present device also effects focus state detection);

S125:
Discriminates whether the timer, activated in the step S105 has reached a value corresponding to ½ of the flickering cycle time:
YES: sequence proceeds to S130;
NO: sequence waits at S125;
The above-mentioned condition of discrimination, namely ½ of the flickering cycle time t, may naturally be replaced by an odd multiple of t/2;

S130:
Starts the photoelectric conversion of the photosensor arrays C, D;

S135:
Executes successive A/D conversions of the outputs of the photosensor arrays C, D;

S140:
Stores the luminance information obtained by processing the A/D converted values;

S145:
Calculates the measured light value, as shown in FIG. 8;

S150:
Calculates the overlapping area luminance a(+c), from the luminance information $a_j$–$a_{j+2}$ of the overlapping area in the photosensor elements $A_p$, according to the equation (2);

S155:
Calculates the overlapping area luminance c(+a), from the luminance information $c_k$–$c_{k+2}$ of the overlapping area in the photosensor elements $C_q$, according to the equation (3);

S160:
Calculates LV(+ac), utilizing the equation (5);

S165:
Calculates R(a), utilizing the equation (6);

S170:
Calculates R(c), utilizing the equation (7);

S175:
Calculates the exact light value LV(p) of the light metering area of the photosensor element $A_p$, utilizing the luminance information $a_p$ (p=1–n) and R(a), according to the equation (8);

S180:
Calculates the exact light value LV(q) of the light metering area of the photosensor element $C_q$, utilizing the luminance information $c_q$ (q=1–m) and R(c), according to the equation (9).

The calculation of the measured light value of the step S145 is terminated by the step S180. Thereafter the sequence proceeds to a step S190 to complete an operation cycle.

In the foregoing explanation and in FIG. 4, it has been assumed that object areas of the photosensor elements $A_j$–$A_{j+2}$ and $C_k$–$C_{k+2}$ mutually overlap for measuring a common object area, but, in practice, said overlapping usually cover about 10 elements in the arrays A and C, such as $A_j$–$A_{j+10}$ and $C_k$–$C_{k+10}$. For this reason, for example the elements $A_p$ and $C_q$, may not strictly overlap but are aberrated by a half of the width of the element, for example because of an error in the positional precision of the arrays. However, even in such case, the overlapping is achieved in the remaining 19/2 elements, so that the values a(+c) and c(+a) may be considered as obtained from a practically same area.

Also in case the values j, indicating the center of crossing point for the photosensor elements $A_p$, $C_q$, vary because of the manufacturing conditions, there may be provided a memory (such as EEPROM) for storing the values of j, k indicating the position of crossing point for the photosensor elements of the individual light metering device.

[Application of light metering device of the present invention]

Figure 9:
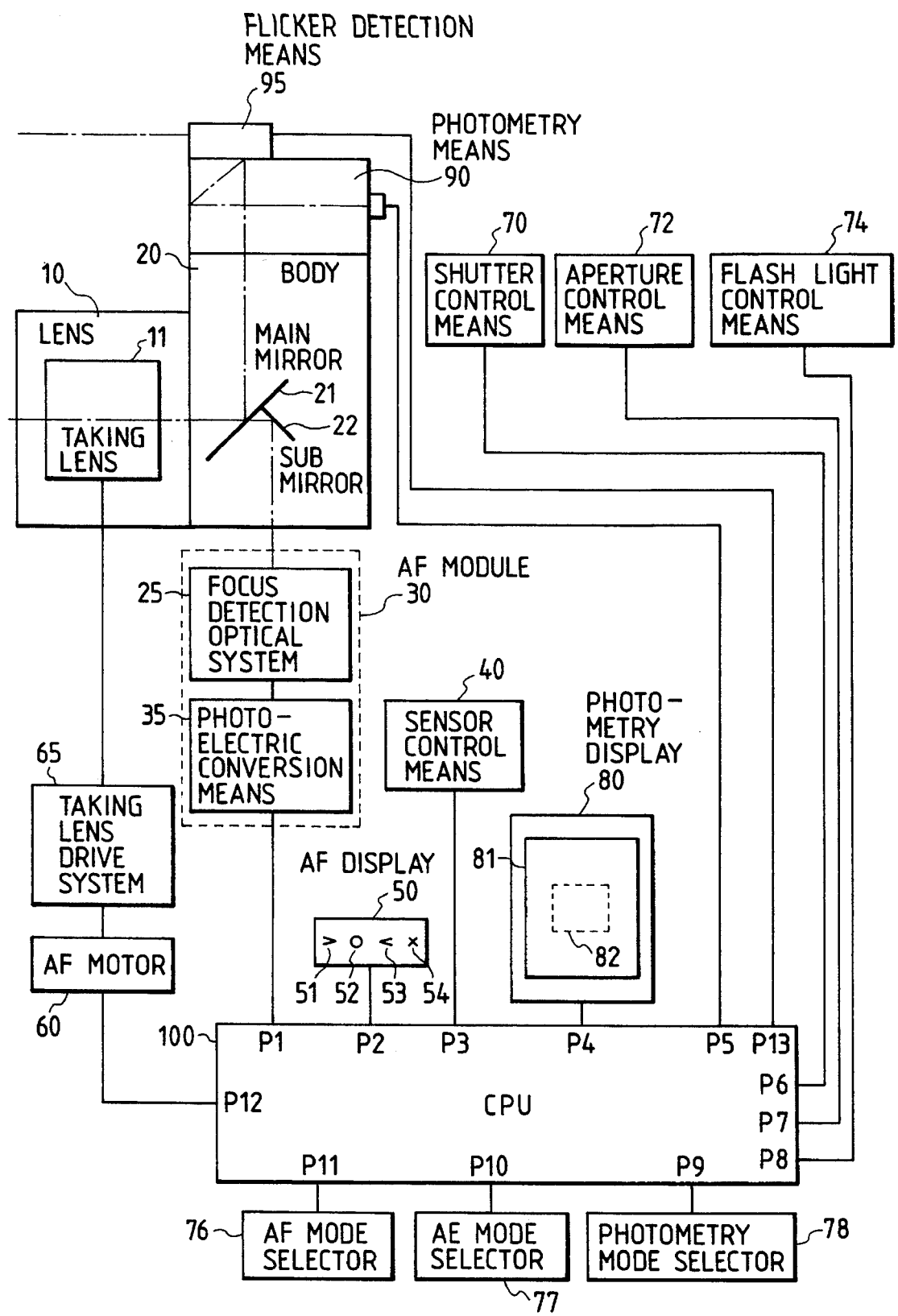
FIG. 9 is a block diagram of the device of the present invention, applied to a single-lens reflex camera.

FIG. 9 is a block diagram of an embodiment of the light metering device of the present invention, capable also of focus state detection, applied to a single-lens reflex camera. The illustrated configuration applies not only to the first embodiment but also to the second and third embodiments. An interchangeable lens 10 is detachably mounted on a camera body 20. Light beam coming from an object and transmitted through a phototaking lens 11 is partly reflected by a main mirror 21 provided in the camera body 20 and guided to a view finder, while the remaining part is transmitted by the main mirror 21, then reflected by a sub mirror 22 and guided as a light beam for focus state detection and light metering, to an AF module 30.

The AF module 30 can detect the amount of defocus of the phototaking lens, as already known, by detecting the relative positional relationship, in the direction of photosensor arrays, of secondary images formed in pair on the photoelectric conversion means 35.

Sensor control means 40 is provided with unrepresented accumulation time control means 41 and predetermined time setting means 42. Said time setting means 42 controls the start time of charge accumulation of the photosensor arrays by receiving a charge accumulating instruction for the respective photosensor arrays from a port (P) 3 of a CPU 100, and sending corresponding control signals to the photosensor arrays 38A–38D of the photoelectric conversion means 35. The accumulation time control means 41 receives instructions for starting and ending the charge accumulation of the respective photosensor arrays from the P3 of the CPU 100, thereby controlling the charge accumulation time of the photosensor arrays of the photoelectric conversion means 35. Also the accumulation time control means 41 sends transfer clock signals etc. to the photoelectric conversion means 35 thereby time-sequentially transferring the outputs of the photosensor elements to the CPU 100, and sends a synchronization signal, synchronized with the start of signal transfer of the outputs $O(A_p)$ of the photosensor elements, to the P3 of the CPU 100. In response, the CPU 100 starts A/D conversion of the photosensor outputs entered to P1, by means of an incorporated A/D converter, and calculates the luminance information by obtaining A/D converted data corresponding to the number of the photosensor elements.

Flicker cycle detection means 95 detects the periodical variation of the light intensity from the object (a period of 100 to 1 msec.) and sends information on the flickering cycle to P13 of the CPU 100. Said flicker cycle detection means 95 is only required to detect the varying cycle time of the light intensity from the object, and is not required to effect light metering in the strictly same areas as the light metering area of the present device nor to detect the absolute luminance value. Consequently it can be composed of a simple photosensor for generally measuring the light in the direction of phototaking axis.

It is already known that focus state detection is possible by calculating the amount of defocus from the data obtained after the A/D conversion, for example by three-point interpolation. Said three-point interpolation will not be explained further, as it is already disclosed in the Japanese Patent Laid-open Application No. 60-37513 of the present assignee.

Based on the obtained defocus amount, the CPU 100 controls the display in display elements 51, 52, 53, 54 of AF display means 50, through P2. Also the set information (focusing-priority AF mode, shutter release-priority AF mode or MF mode) of the AF mode selection means 76 is supplied to P11 of the CPU 100, which, in the focusing-priority AF mode or shutter release-priority AF mode, controls the driving direction and amount of an AF motor 60 through P12, based on said defocus amount, thereby moving the phototaking lens 11 to an in-focus position through a phototaking lens drive system 65.

Also the CPU 100 effects the data processing of the present invention, based on the data obtained at the same time or before or after the above-mentioned calculation of defocus amount, thereby calculating the spot-measured light value.

Also the CPU 100 calculates the light values, other than the spot light value, from the output signals of the light metering means 90, supplied to P5. The CPU 100 also controls the display on display elements 81, 82 of light metering display means 80 through P4, based on the setting information, supplied from the light metering mode selection means 78 to P9 and indicating the spot light metering mode or other light metering modes. Furthermore, depending on the set information (manual mode, shutter-priority AE mode, iris-priority AE mode, programmed AE mode or daylight flash mode) supplied from AE mode selection means 77 to P10, the CPU 100 controls shutter control means 70, diaphragm aperture control means 72 and flash control means 74 singly or in combination through P6–P8, based on the calculated light value, thereby providing the film with an appropriate exposure.

In the foregoing there have been outlined the configuration and function of an embodiment in which the light metering device, capable also of focus state detection, is applied to a single-lens reflex camera.

(Charge accumulation time)

The charge accumulation time T(A) is determined by entering the successive outputs of the CCD or the output of a silicon photodiode into the accumulation time control means 41 in such a manner that none of the outputs of the photosensor elements employed for light metering in the photosensor array (array A in the above-explained example) exceeds the A/D convertible range. This method is called peak auto gain control (peak AGC).

In order to obtain luminance information of a high precision with little digitizing error, the level of peak AGC is preferably set close to the limit of the A/D convertible range. In practice, however, said level of peak AGC is set at a predetermined value between said limit of A/D convertible range and about a half thereof, in order to avoid saturation.

In case optimum photoelectrically converted outputs cannot be obtained by a same charge accumulation time for different photosensor arrays, for example because of difference in the light amounts entering the photosensor arrays, in the areas or photoelectric conversion efficiency of the photosensor elements or in the primary amplifying condition before the A/D conversion, peak AGC is applied to each array to determine an optimum charge accumulation time for each array.

The constant CS(A) is determined for each photosensor array, for correctly calculating the luminance information $a_p$ from the photosensor element output $O(A_p)$ and the charge accumulation time T(A). Said constant CS(A) may be so selected that same luminance information can be obtained from the photosensor arrays, from a plane of uniform luminance.

In case the entire row A is used for light metering, the peak AGC is conducted in the range of elements $A_1$–$A_n$. Also in case the light metering area is limited to $A_W$–$A_{W+X}$ in the vicinity of the central crossing area, by a spot light, metering selector switch, constituting light metering area setting means, the peak AGC is applied only to said elements for determining the optimum charge accumulation time T(A') in such a manner that the photosensor element outputs $O(A_W)-O(A_{W+x})$ do not exceed the A/D convertible range.

Since the device of the present embodiment works also for focus state detection, the focus detection area may be selected differently from the light metering area.

Consequently, the peak AGC has to be applied on the outputs of photosensor elements over the entire focus detection area, and the charge accumulation time T(B) for optimum focus state detection may be different from the charge accumulation time T(A) for optimum light metering.

For example, in case the focus state detection is conducted by all the photosensor elements while the light metering is conducted in the vicinity of the central overlapping area, and if an object of high luminance is present in the peripheral area, the charge accumulation time T(B) for optimum focus state detection becomes shorter than the charge accumulation time T(A) for optimum light metering, because of the presence of said high luminance object in the peripheral area.

Consequently the outputs $O(A_W)$ of the photosensor elements in the vicinity of the central overlapping area at the charge accumulation time T(B) for optimum focus state detection become considerably lower than the limit of the A/D convertible range, and the accuracy of light metering is deteriorated because of a large digitizing error in the A/D conversion.

On the other hand, if the photosensor elements are driven with the charge accumulation time T(A) for optimum light metering, the outputs $O(A_W)$ of the photosensor elements corresponding to the high luminance object in the peripheral part exceed the A/D convertible limit, whereby the accuracy of focus state detection is significantly deteriorated.

A first method for selecting the charge accumulation time in such situation consists of discriminating, by discrimination means, shorter one of the charge accumulation times T(A) and T(B) and employing said shorter time for the charge accumulation of both purposes. In the above-mentioned example, even the outputs of photosensor elements at the relatively short charge accumulation time T(B) can provide a reasonably acceptable result in the light metering, and this better than the result of focus state detection obtained with the longer charge accumulation time T(A), where the outputs of photosensor elements exceed the A/D convertible limit and become saturated.

A second method consists of alternating an operation for which the charge accumulation is optimized in a short time and an operation for which the charge accumulation is optimized in a longer time.

At first either of the focus state detection and light metering, having a shorter optimum charge accumulation time, is executed when said optimum time is reached, and then the other operation is executed when a longer optimum time is reached. In the above-mentioned example, the peak AGC optimum for focus state detection is executed, and the focus state detection is conducted with a relative short charge accumulation time T(B). In the next charge accumulation, the peak AGC is executed for light metering, and the light metering is conducted with a relatively long charge accumulation time T(A). In this method, though the operations are alternate, the focus state detection and the light metering can both be executed with a high precision.

A third method, applicable in the focusing-priority AF mode (in which the exposure is not executed until the phototaking lens 11 reaches the in-focus position) consists of executing the focus state detection and the focusing operation at first, regardless of the length of the charge accumulation time for optimum light metering and that for optimum focus state detection, and effecting the light metering operation after the phototaking lens 11 reaches the in-focus position. This is because, in said mode, the light metering operation can be conducted later, as the exposure is not started until the phototaking lens 11 reaches the in-focus position.

[2nd embodiment]

Figure 10:
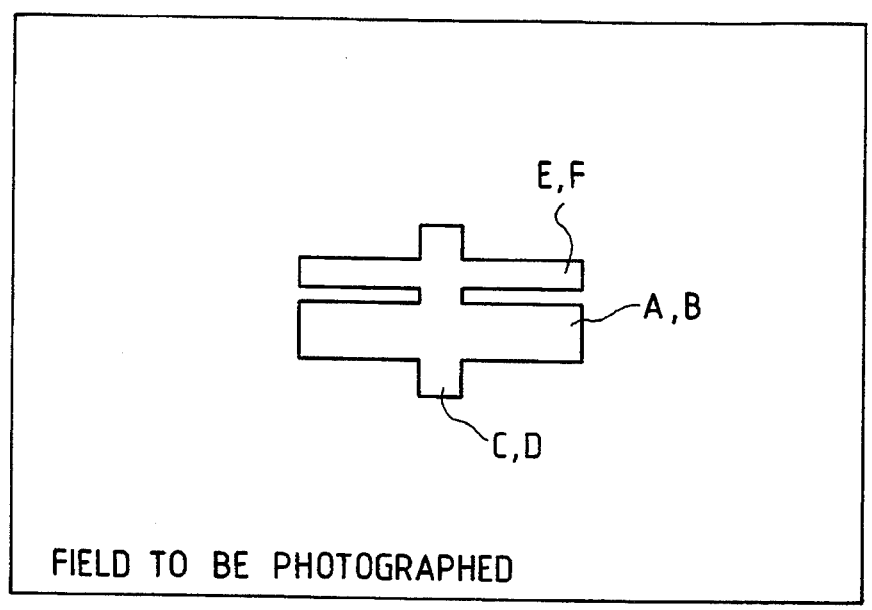
FIG. 10 is a view of a light metering area in a second embodiment.

In the following there will be explained a second embodiment of the light metering device of the present invention, employing a double cross-shaped light metering area as shown in FIG. 10, as a variation of the light metering area shown in FIG. 2.

Figure 11:
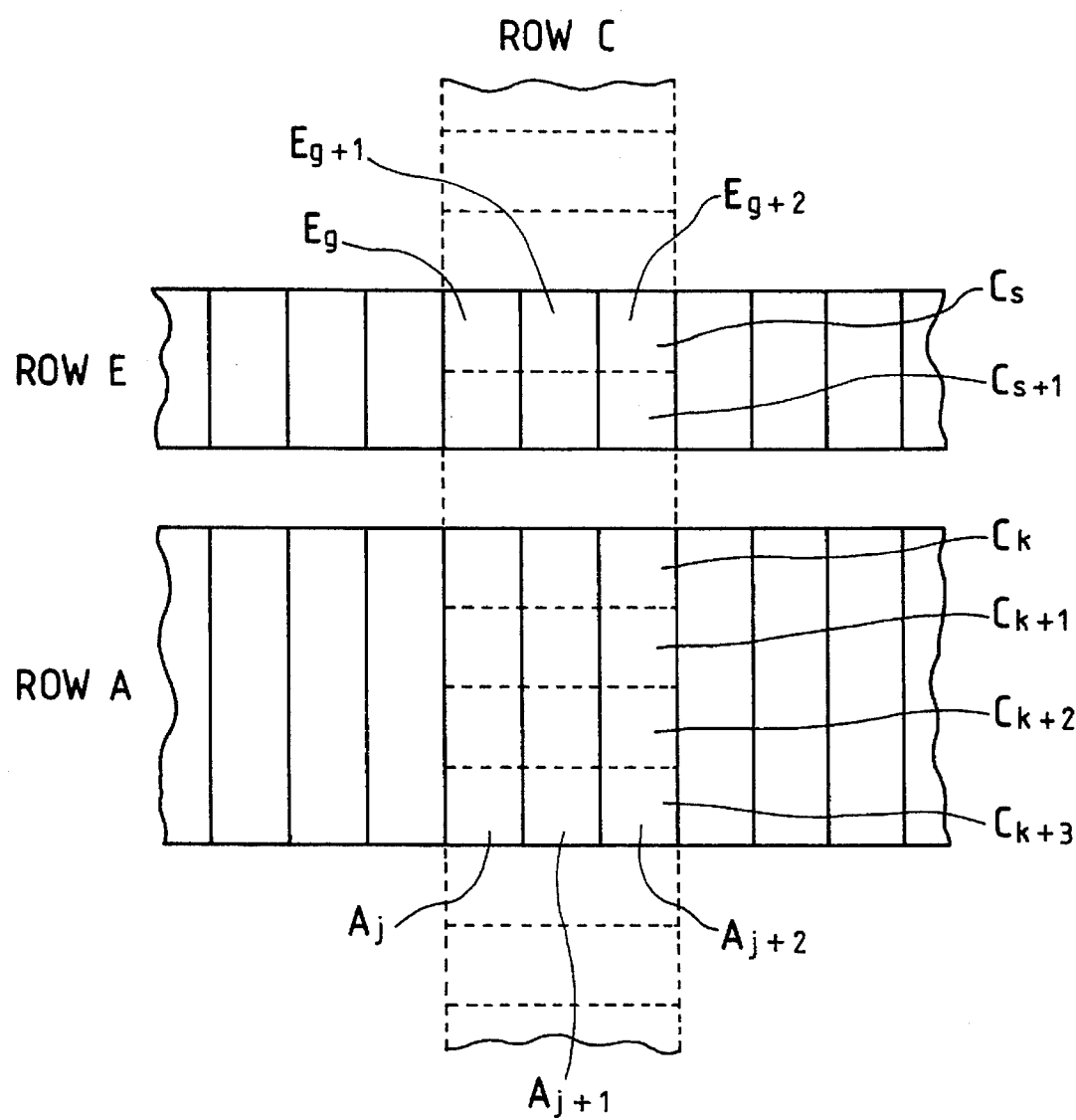
FIG. 11 is a view showing the arrangement of photosensor elements of the photoelectric conversion means in the second embodiment.

FIG. 11 is a partial magnified view of the light metering area of the photosensor arrays in the present embodiment, in which the aperture of the field mask 31 of the AFAE module shown in FIG. 2 is widened, and the photosensor arrays are arranged in a double cross shape on the photoelectric conversion means 35. In the double cross pattern, the lower horizontal photosensor arrays consisting of photosensor elements $A_p$, $B_p$ (p=1–n) are called rows A and B; upper photosensor arrays consisting of elements $E_r$, $F_r$ (r=1–h) are called rows C and D; and vertical arrays consisting of elements $C_q$, $D_q$ (q=1–m) are called rows C and D.

The rows A, B are composed of photosensor elements of large areas for focus state detection in low luminance state, while the rows E, F are composed of elements of small areas for focus state detection in high luminance state.

The luminance information, obtained by A/D conversion of the outputs of the photosensor elements of respective rows and corresponding to the photosensor elements $A_p$, $B_p$; $E_r$, $F_r$; $C_q$, $D_q$ are respectively represented by $a_p$, $b_p$ (p=1–n); $e_r$, $f_r$ (r=1–h); and $c_q$, $d_q$ (q=1–m).

In consideration of the use of a flickering light source, as explained before, the light metering operation has to be conducted at the same time in the rows A and B; or C and D; or E and F, but need not be conducted simultaneously among A (or B), C (or D) and E (or F).

In the following the rows A, C and E are taken as representative in each pair.

The rows A and C have a measurement area $A_j$–$A_{j+2}$, $C_k$–$C_{k+2}$, while the rows E and C have an overlapping measurement area $E_g$–$E_{g+2}$, $C_s$–$C_{s+1}$.

In the following explanation, the luminance information will be represented by $a_p$, $c_q$ and $e_r$ in a similar manner as in the foregoing.

The configuration relating to the rows A and C is same as in the foregoing first embodiment.

The photoelectric conversion of the rows A and C is conducted at a first timing T0 of photoelectric conversion and at a time T1 delayed by ½ of the flickering cycle time t (or an odd multiple of t/2). Thus:

$$T0: (a_j+a_{j+1}+a_{j+2})/3=a(+c) \qquad (2)$$

$$T1: (c_k+c_{k+1}+c_{k+2}+c_k 3)/4=c(+a) \qquad (10)$$

Then LV(+ac) is calculated in the overlapping light metering area. Also R(a), R(c) are calculated, and LV(p), LV(q) are finally determined.

Figure 12:
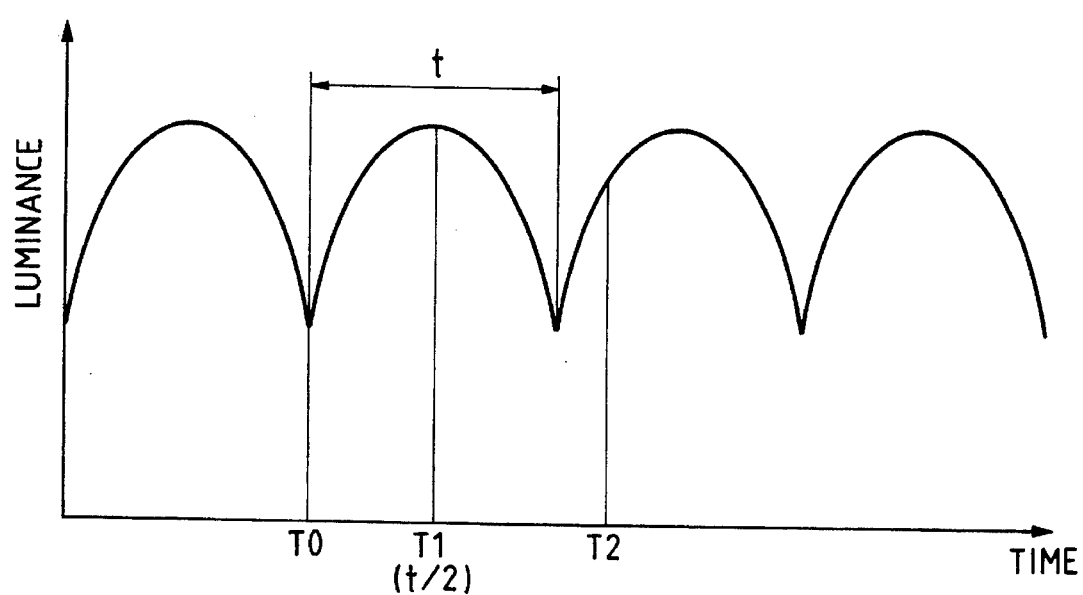
FIG. 12 is a chart showing the timings of photoelectric conversions in the second embodiment, including an additional timing T2.

The photoelectric conversion of the row E may be conducted at an arbitrary time T2, irrelevant from the timings T0, T1 of the photoelectric conversions of the rows A, C, as shown in FIG. 12.

More specifically, the light metering operation of the row E is conducted in the following manner.

The photoelectric conversion is executed at an arbitrary time T2 to obtain the luminance information $e_r$ of the row E.

Then the overlapping area $E_g$–$E_{g+2}$, $C_s$–$C_{s+1}$ of the rows E and C shown in FIG. 11 is considered, and the luminance in said overlapping area is determined as follows:

$$T2: (e_g+e_{g+1}+e_{g+2})/3=e(+c) \quad (11)$$

$$T1: (c_s+c_{s+1})/2=c(+e) \quad (12)$$

$$Rc(e)=c(+e)/e(+c) \quad (13)$$

wherein $e(+c)$ is the luminance of the row E overlapped with the row C, and $c(+e)$ is the luminance of the row C overlapped with the row E.

$Rc(e)$ is the luminance output ratio of the rows E and C in a same area, resulting from the difference between T1 and T2 (different phases of flickering cycle at the photoelectric conversions). Said ratio allows to handle the luminance information $e_r$ of the row E in equivalent manner as the luminance information $c_q$ of the row C:

$$e'_r=e_r \times Rc(e) \quad (14)$$

wherein $e'_r$ represents the object luminance under the illuminating condition at T1. For obtaining exact object luminance LV(*), the correction coefficient R(c) in the equation (9) is employed in the following manner:

$$LV(r) = e'_r \times R(c) \quad (15)$$
$$= e_r \times Rc(e) \times R(c)$$

wherein LV(r) is the exact (average) light value in the light metering area composed of the elements $E_r$.

FIGS. 13 and 14 are flow chart showing the algorithm of above-explained photoelectric conversion and light metering, wherein same steps as those in FIGS. 7 and 8 are represented by same step numbers.

At first, steps S100–S140 execute the photoelectric conversion of the rows A–D, and store the obtained data. Then:
S200:
Starts photoelectric conversion (charge accumulation of the photosensor arrays E, F;
S205:
Effects successive A/D conversions on the outputs of said arrays E, F;
S210:
Stores the luminance information, obtained by processing the A/D converted values;
S220:
Calculates the measured light value. The content of this step S220 is shown in FIG. 14;
S150:
Calculates $a(+c)$, from the luminance information $a_j$–$a_{j+2}$ as explained before;
S225:
Calculates the luminance $c(+a)$ of the overlapping area from the luminance information $c_k$–$c_{k+}$ in the outputs of the photosensor elements $C_q$, utilizing the equation (10);
S160–S180:
Calculates LV(+ac), R(a), LV(p) etc.;
S230:
Calculates the luminance $e(+c)$ of the overlapping area from the luminance information $e_j$–$e_{j+2}$ in the outputs of the photosensor elements $E_r$, utilizing the equation (11);
S235:
Calculates the luminance $c(+e)$ of the overlapping area from the luminance information $c_k$–$c_{k+1}$ in the outputs of the photosensor elements $C_q$, utilizing the equation (12);
S240:
Calculates the luminance ratio $Rc(e)$ of the rows E and C for a same area, utilizing the equation (13);
S245:
Calculates the exact light value LV(r) in the light metering area of the row E, utilizing the luminance information $e_r$ (r=1–h), R(c) and luminance ratio Re(e) in the equation (15).

The light value calculation of the step S220 is terminated by the step S245, and the sequence then proceeds to a step S190 for completing one cycle.

In this embodiment, the first photoelectric conversion for light metering may be conducted in the rows A and B, or the rows E and F. However, since the photosensor elements in the rows A and B are larger in area than those in the rows E and F, the charge accumulation time for obtaining same luminance information is shorter in the rows A and B. Consequently, the photoelectric conversion of the rows A and B is preferably executed at first, in order to decrease the timer value in the step S125 (to employ t/2 instead of 3t/2), thereby increasing the driving speed of the present device.

[3rd embodiment]

In the 2nd embodiment, the photoelectric conversion of the row A is executed at T0, then that of the row C is executed after the lapse of a half of the flickering cycle time t of the light source (T1=T0+t/2), and that of the row E is executed after the lapse of an arbitrary time T2. In the present embodiment, the photoelectric conversions are executed at first in the row A at T0, then in the row E at T1, and in the row C at T2.

From the overlapping areas, there are obtained following light values:

$$T0: (a_j+a_{j+1}+a_{j+2})/3=a(+c) \quad (2)$$

$$T2: (c_k+c_{k+1}c_{k+2}+c_{k+3})/4=c(+a) \quad (16)$$

$$T1: (e_g+e_{g+1}e_{g+2})/3=e(+c) \quad (17)$$

$$T2: (c_s+c_{s+1})/2=c(+e) \quad (18)$$

$$Rc(a)=c(+a)/a(+c) \quad (19)$$

$$Rc(e)=c(+e)/e(+c) \quad (13)$$

$$Rca(ce)=c(+a)/c(+e) \quad (20)$$

wherein $Rc(a)$ is the luminance ratio of T2/T0 in a same area; $Rc(e)$ is the luminance ratio of T2/T1 area; and $Rca(ce)$ is the luminance ratio of the overlapping areas under a same light source condition at T2. Said luminance ratio stands also for the exact luminance (time-averaged luminance in each area). Based on the coefficients of the equations (13), (19) and (20), there are obtained following equations:

$$LV: T0(+ac)=a(+c) \quad (21)$$

(measured light value in the overlapping area of the rows A and C at T0)

$$LV: T1(+ac)=e(+c) \times Rc(e) \times Rca(ce) \quad (22)$$

(measured light value in the overlapping area of the rows A and C at T1)

$$LV(+ac)=\{LV: T0(+ac)+LV: T1(+ac)\}/2 \quad (23)$$

LV (+ac) is the exact measured light value of the overlapping area of the rows A and C.

$$R(a)=LV(+ac)/a(+c) \quad (6)$$

$$R(c)=LV(+ac)/c(+a) \quad (7)$$

$$R(e)=R(c) \times Rc(e) \quad (24)$$

The equation (24) provides a correction coefficient for the row E, which is obtained at first by transforming the light value of the row E equivalent to the output of the row C and multiplying the correction coefficient for the row C. These correction coefficients are utilized for determining the exact (averaged) light values of the light metering areas of the photosensor elements $A_p$, $C_q$, $E_r$ in the following manner:

$$LV(p)=a_p \times R(a) \tag{8}$$

$$LV(q)=c_q \times R(c) \tag{9}$$

$$LV(r)=e_r \times R(e) \tag{25}$$

FIGS. 15 and 16 are flow charts showing the algorithm of the above-explained photoelectric conversion and light metering, wherein same steps as those in FIGS. 7, 8, 13 and 14 are represented by said step numbers.

S100–S125:
Effects photoelectric conversion of the photosensor arrays A, B;

S200–S210:
Effects photoelectric conversion of the photosensor arrays E, F;

S130–S140:
Effects photoelectric conversion of the photosensor arrays C, D;

S250:
Calculates the measured light value, according to FIG. 16;

S150:
Same as explained before;

S260:
Calculates the luminance c(+a) of the overlapping area from the luminance information $c_k$–$c_{k+}$ of the photosensor elements $C_q$ at an arbitrary time T2, utilizing the equation (16);

S265:
Calculates the luminance e(+c) of the overlapping area from the luminance information $e_g$–$e_{g+2}$ of the photosensor elements $E_r$ at the predetermined time T1, utilizing the equation (17);

S270:
Calculates the luminance c(+e) of the overlapping area from the luminance information $c_s$–$c_{s+1}$ of the photosensor elements $C_q$ at an arbitrary time T2, utilizing the equation (18);

S275:
Calculates the T0/T2 time ratio Rc(a) of the luminance output of the arrays A, C in a same area, utilizing the equation (19);

S240:
Calculates the measured light output ratio Rc(e), in the same manner as in the preceding step;

S280:
Calculates the luminance ratio Rca(ce) of the arrays A, C to the array E, C at a same timing T2, utilizing the equation (20);

S285:
Determines the luminance in the overlapping area of the arrays A, C at T0, shown in the equation (21);

S290:
Determines the luminance in the overlapping area of the arrays A, C at T1, shown in the equation (22);

S295:
Determines the exact (averaged) luminance in the overlapping area of the arrays A, C, shown in the equation (23);

S165–S170:
Determine the coefficients R(a), R(c) mentioned before;

S300:
Determines the coefficient R(e), for obtaining the exact object luminance by the luminance information $e_r$ on the array E, utilizing the equation (24);

S175–S180:
Determines the exact measured light value explained above;

S305:
Calculates the exact light value LV(r) in the light metering area of the array E, utilizing $e_r$, R(e) in the equation (25);

The light value calculation of the step S250 is terminated by the step S305. The sequence thereafter proceeds to a step S190, whereby a cycle is completed.

As explained in the foregoing, it is also possible to obtain exact light values over the entire photosensor arrays, by effecting the photoelectric conversions in the photosensor arrays A and E, which do not have the overlapping area, respectively at an initial timing and another timing delayed by ½ of the flickering cycle time t of the light source, and also effecting the photoelectric conversion in the photosensor array C which crosses said arrays A and E.

It is therefore possible to expand the freedom of the method of calculating the light value, even in case the signal exchange with the photosensor arrays is difficult in relation to the arrangement of said arrays or the wirings to said arrays.

As will be apparent from the sequence of the light value calculating method explained above, the algorithm of said method is applicable also to a light metering device having a plurality of photosensor arrays.

In such case, the following two conditions have to be satisfied.

The first condition is that the light metering area of each photosensor array crosses, in at least a position, that of another photosensor array, thereby defining an overlapping light metering area.

The second condition is that arbitrary two of the photosensor arrays effect photoelectric conversions with a time difference corresponding to ½ (or an odd multiple thereof) of the flickering cycle time of the light source. Combination of mutually crossing two arrays corresponds to the second embodiment, while combination of non-crossing two arrays corresponds to the third embodiment.

As long as the foregoing two conditions are satisfied, it is possible to calculate the exact measured light value over the entire light metering areas of the photosensor arrays, without the influence of the flickering light source and by means of a single photoelectric conversion operation in each array, by the extension of the algorithm of the second and third embodiments shown in FIGS. 13 to 16.

(Case of low object luminance)

In case the object luminance is low, the charge accumulation time T(A) has to be extended in order to obtain appropriate luminance information. It is to be noted that, when the charge accumulation time T(A) becomes equal to about 80% of the flickering cycle time of the light source, the measured light value shows little fluctuation, and a single photoelectric conversion can provide an exact light value practically regardless of the timing of photoelectric conversion.

Consequently, the charge accumulation time T(A) controlled by the accumulation time control means 41 becomes equal to about 80% of the flickering cycle time, there may be employed a method of effecting the photoelectric conversion for all the photosensor arrays at the same time.

Thus, if the object luminance is at a certain low level, comparator means compares the charge accumulation time T(A) of the photosensor arrays controlled by the accumulation time control means 41, with the time T(a) determined by the time setting means, and, if the former is longer, the metering method switching means changes the method of effecting the photoelectric conversion in the second photosensor array with a time delay of t/2 from the start of photoelectric conversion in the first photosensor array, to the method of effecting the photoelectric conversion in all the photosensor arrays at the same time.

This is because, in such situation, the luminance information of sufficient accuracy can be obtained even by the simultaneous photoelectric conversion in all the photosensor arrays, and also because the above-mentioned method of effecting the second photoelectric conversion with a delay time of ½ (or an odd multiple thereof) of the flickering cycle time t requires a delay time of 1.5t or 2.5t in case the object is dark, whereas the latter method of simultaneous photoelectric conversions in all the photosensor arrays can provide the measured light value faster in a time of 0.8t.

It is also possible to provide accumulation time memory means instead of the time setting means, and to switch the light metering method if the accumulation time T(A) becomes longer than the memorized time T(a). Since the power supply frequency is 50 or 60 Hz in various countries as explained before, it is conceivable to memorize a time of about 0.8 msec., which corresponds to 80% of the longer flickering cycle time (10 msec.) for the 50 Hz power supply.

Said time, 8 msec., corresponds to a considerably high accuracy of light metering, and a shorter time, such as about 5–7 msec., may be acceptable depending on the nature of camera (high classed or popular classed), light metering mode (spot light metering mode or divided-area light metering mode with spot weighted), or kind of the photographic film (reversal or negative). Also there may be employed a time of about 9 to 10 msec., for an even higher accuracy of light metering.

In such case, said memory means stores plural times T(a1, a2, a3, ...). Also selector means is provided to select one of the above-mentioned plural exposure conditions (kind of film, light metering mode etc.), and a time matching said selected exposure condition is selected.

Said selected time T(a1) and the charge accumulation time T(A) are compared in the comparator means, and, if the latter is longer, there is employed the method of simultaneous photoelectric conversions in all the photosensor arrays.

Also if the photographer can identify the flickering cycle time of the light source illuminating the object in the phototaking situation, there may be added unrepresented manual setting means for the flickering cycle time, thereby enabling to manually set the cycle time. Such configuration enables the device to respond to a special flickering light source.

(Out-of-focus state)

The foregoing description has assumed a state of zero defocus, or an in-focus state, in which the luminance information $a_p$ and $b_p$ are obtained from a same object portion (same applies to the rows C and D, or E and F), but exact light value can be similarly calculated also in the out-of-focus state.

In an out-of-focus state, the positional aberration of the luminance information $a_p$ and $b_p$, corresponding to the amount of defocus, is calculated by the aforementioned focus state detection algorithm, disclosed in the Japanese Patent Laid-open Application No. 60-37513. (The focus state detection is achieved by calculating the amount of defocus from the amount of positional aberration.)

As an example, there will be explained the luminance information in the crossing area of the photosensor arrays $A_1$–$A_n$ and $C_1$–$C_m$, explained in relation to FIG. 2 and the equations (2) to (4).

It is assumed that, corresponding to the current defocus amount, the luminance information $a_p$ and $b_p$ have a positional aberration of 2×y, and the luminance information $c_q$ and $d_q$ have a positional aberration of 2×z. The current outputs a"–d" can be represented as follows:

$$a''_{j-y}=b''_{j+y}=a_j=b_j$$

$$a''_{j+1-y}=b''_{j+1+y}=a_{j+1}=b_{j+1}$$

$$a''_{j+2-y}=b''_{j+2+y}=a_{j+2}=b_{j+2}$$

$$c''_{k-z}=d''_{k+z}=c_k=d_k$$

$$c''_{k+1-z}=d''_{k+1+z}=c_{k+1}=d_{k+1}$$

$$c''_{k+2-z}=d''_{k+2+z}=c_{k+2}=d_{k+2} \quad (26)$$

Thus the foregoing equations (2) and (3) may be amended as follows:

$$(a''_{j-y}+a''_{j+1-y}+a''_{j+2-y})/3=a(+c) \quad (27)$$

$$(c''_{k-z}+c''_{k+1-z}+c''_{k+2-z})/3=c(+a) \quad (28)$$

The equation (4) and subsequent equation may be amended in a similar manner.

In case y and z are not integers, they may be replaced by integers y', z' closest to the true values of y and z.

As explained in the foregoing, the light metering device of the present invention for use in a camera determines, under a flickering light source, the luminance information by first one of two photoelectric conversion arrays having mutually crossing light metering areas in the object field, and, after a predetermined time, determines the luminance information by second one, and is thus capable of determining the averaged light value over the entire light metering areas from said luminance information, without the influence of the flickering light source. Said device is particularly effective for promptly determining the average light value over the entire light metering areas.

Also in case said light metering area is expanded by the addition of at least a photoelectric conversion array to three or more arrays, it is still possible to promptly determine the average light value of the entire light metering areas, and the sequential order of light metering calculation is not uniquely limited as long as the photoelectric conversions in arbitrary two arrays can be conducted with a predetermined delay time.

Also said predetermined delay time can be automatically determined by the addition of means for detecting the flickering cycle time of the light source.

Separately, there may be added means for storing the predetermined time, by predicting the flickering cycle time of the light source. In this manner the means for setting said predetermined time can be simplified, and the cost of the device can be reduced.

Under a special flickering light source, it is effective to provide means for manually setting the flickering cycle time.

On the other hand, if the flickering light source is dark, the charge accumulating photoelectric conversion means requires a longer charge accumulation time but the accuracy of measured light value is not improved. In such case, there is provided means for switching the light metering method from a method of effecting the photoelectric conversions in the first and second photoelectric conversion means with a predetermined delay time therebetween to a method of activating all the charge accumulating photoelectric conversion means at the same time, thereby promptly obtaining exact light value.

Also, in the phototaking operation with the camera, the light metering area alone may be made narrower. In such case, since the photoelectric conversion means of the present invention is used both for focus state detection and for light metering, the charge accumulation time for optimum focus state detection may become different from that for optimum light metering. In such case, if the photoelectric conversion is conducted with the charge accumulation time for either operation, the accuracy of detection of the other operation will be deteriorated. In order to obtain appropriate accuracy of detection in both operations, both operations are conducted with the shorter charge accumulation time, or the focus state detection and the light metering are conducted alternately, starting from the one requiring a shorter charge accumulation time.

What is claimed is:

1. A light metering device comprising:

first photoelectric conversion means for effecting photoelectric conversion on a light beam coming from a first area of an object field;

second photoelectric conversion means for effecting photoelectric conversion on a light beam from a second area having an overlapping area with said first area in the object field;

first luminance calculation means for calculating first luminance information, from the output of said first photoelectric conversion means;

second luminance calculation means for calculating second luminance information, from the output of said second photoelectric conversion means;

luminance processing means for calculating first overlapping area luminance in said overlapping area of said first photoelectric conversion means, and second overlapping area luminance in said overlapping area of said second photoelectric conversion means; and light value calculation means for calculating light values in, for each area the corresponding areas, utilizing said first and second luminance information and said first and second overlapping area luminances.

2. A device according to claim 1, serving also for focus state detection of a camera.

3. A device according to claim 1, further comprising:

predetermined time setting means for setting a predetermined time;

wherein the photoelectric conversion of said second photoelectric conversion means is started after a predetermined time, set by said predetermined time setting means, from the start of photoelectric conversion of said first photoelectric conversion means.

4. A device according to claim 3, wherein said predetermined time setting means includes flicker cycle time detection means for detecting the flickering cycle time of an light source illuminating the object, and said predetermined time is set as an odd multiple of ½ of the flickering cycle time detected by said flicker cycle time detection means.

5. A device according to claim 3, wherein said predetermined time setting means is cycle time memory means for storing, in advance, an odd multiple of ½ of flickering cycle time of the light source.

6. A device according to claim 3, wherein said predetermined time setting means is manual time setting means enabling time setting by a photographer.

7. A device according to claim 3, wherein each of said photoelectric conversion means is a charge-accumulating photoelectric conversion element, said device further comprising:

accumulation time control means for controlling the charge accumulation time of each of said photoelectric conversion means;

accumulation time setting means for setting a predetermined charge accumulation time;

comparator means for comparing each charge accumulation time obtained from said accumulation time control means with said predetermined charge accumulation time; and switch means for selecting a method of controlling both of said photoelectric conversion means at the same time with said predetermined charge accumulation time, in case said charge accumulation time is longer than said predetermined charge accumulation time in any of the results of comparison by said comparator means.

8. A device according to claim 7, wherein said accumulation time setting means includes flicker cycle time detection means for detecting the flickering cycle time of the light source illuminating a object, and the flickering cycle time detected by said flicker cycle time detection means is multiplied by a predetermined coefficient to provide said predetermined charge accumulation time.

9. A device according to claim 7, wherein said accumulation time setting means stores plural accumulation times in advance, and one of said plural accumulation times is selected according to a change of setting of the device.

10. A device according to claim 3, wherein said first photoelectric conversion means is so set as to complete the photoelectric conversion within a shorter time than in the second photoelectric conversion means.

11. A device according to claim 2, wherein, if an unfocused state is identified in a focus state detecting operation, in the calculation of said luminance information in said overlapping area of each said photoelectric conversion means, each area for calculating said luminance information is regulated according to the defocus amount from the focused state.

12. A light metering device comprising:

first photoelectric conversion means for effecting photoelectric conversion on a light beam from a first area of an object field;

second photoelectric conversion means for effecting photoelectric conversion on a light beam from a second area, having a first overlapping area with said first area in the object field;

third photoelectric conversion means for effecting photoelectric conversion on a light beam from a third area, having a second overlapping area with said second area in the object field;

first luminance calculation means for calculating first luminance information, from the output of said first photoelectric conversion means;

second luminance calculation means for calculating second luminance information, from the output of said second photoelectric conversion means;

third luminance calculation means for calculating third luminance information, from the output of said third photoelectric conversion means;

first luminance processing means for calculating a first overlapping area luminance in said first overlapping area of said first photoelectric conversion means and a second overlapping area luminance in said first overlapping area of said second photoelectric conversion means;

second luminance processing means for calculating a third overlapping area luminance in said second overlapping area of said second photoelectric conversion means and a fourth overlapping area luminance in said second overlapping area of said third photoelectric conversion means; and light value calculation means for calculating the light values in said first, second and third areas, utilizing said first, second and third luminance information and said first, second, third and fourth overlapping area luminances.

13. A device according to claim 12, serving also for focus state detection of a camera.

14. A device according to claim 12, further comprising:

predetermined time setting means for setting a predetermined time;

wherein the photoelectric conversion of said second photoelectric conversion means is started after a predetermined time, set by said predetermined time setting means, from the start of photoelectric conversion of said first photoelectric conversion means.

15. A device according to claim 14, wherein said predetermined time setting means includes flicker cycle time detection means for detecting the flickering cycle time of the light source illuminating a object, and said predetermined time is set as an odd multiple of ½ of the flickering cycle time detected by said flicker cycle time detection means.

16. A device according to claim 14, wherein said predetermined time setting means is cycle time memory means for storing, in advance, an odd multiple of ½ of flickering cycle time of the light source.

17. A device according to claim 14, wherein said predetermined time setting means is manual time setting means enabling time setting by a photographer.

18. A device according to claim 14, wherein each of said photoelectric conversion means is a charge-accumulating photoelectric conversion element, said device further comprising:

accumulation time control means for controlling the charge accumulation time of each of said photoelectric conversion means;

accumulation time setting means for setting a predetermined charge accumulation time;

comparator means for comparing each charge accumulation time obtained from said accumulation time control means with said predetermined charge accumulation time; and switch means for selecting a method of controlling all the photoelectric conversion means at the same time with said predetermined charge accumulation time, in case said charge accumulation time is longer than said predetermined charge accumulation time in any of time results of comparison by said comparator means.

19. A device according to claim 18, wherein said accumulation time setting means includes flicker cycle time detection means for detecting the flickering cycle time of a light source illuminating the object, and the flickering cycle time detected by said flicker cycle time detection means is multiplied by a predetermined coefficient to provide said predetermined charge accumulation time.

20. A device according to claim 18, wherein said accumulation time setting means stores plural accumulation times in advance, and one of said plural accumulation times is selected according to a change of setting of the device.

21. A device according to claim 14, wherein said first photoelectric conversion means is so set as to complete the photoelectric conversion within a shorter time than in the second photoelectric conversion means.

22. A device according to claim 12, further comprising:

predetermined time setting means for setting a predetermined time;

wherein the photoelectric conversion of said third photoelectric conversion means is started after a predetermined time, set by said predetermined time setting means, from the start of photoelectric conversion of said first photoelectric conversion means.

23. A device according to claim 22, wherein said predetermined time setting means includes flicker cycle time detection means for detecting the flickering cycle time of the light source illuminating a object, and said predetermined time is set as an odd multiple of ½ of the flickering cycle time detected by said flicker cycle time detection means.

24. A device according to claim 22, wherein said predetermined time setting means is cycle time memory means for storing, in advance, an odd multiple of ½ of flickering cycle time of the light source.

25. A device according to claim 22, wherein said predetermined time setting means is manual time setting means enabling time setting by a photographer.

26. A device according to claim 23, wherein each of said photoelectric conversion means is a charge-accumulating photoelectric conversion element, said device further comprising:

accumulation time control means for controlling the charge accumulation time of each of said photoelectric conversion means;

accumulation time setting means for setting a predetermined charge accumulation time;

comparator means for comparing said charge accumulation time obtained from said accumulation time control means with said predetermined charge accumulation time; and switch means for selecting a method of controlling all the photoelectric conversion means at the same time with said predetermined charge accumulation time, in case said charge accumulation time is longer than said predetermined charge accumulation time in any of the results of comparison by said comparator means.

27. A device according to claim 26, wherein said accumulation time setting means includes flicker cycle time detection means for detecting the flickering cycle time of the light source illuminating a object, and the flickering cycle time detected by said flicker cycle time detection means is multiplied by a predetermined coefficient to provide said predetermined charge accumulation time.

28. A device according to claim 26, wherein said accumulation time setting means stores plural accumulation times in advance, and one of said plural accumulation times is selected according to a change of setting of the device.

29. A device according to claim 22, wherein said first photoelectric conversion means is so set as to complete the photoelectric conversion within a shorter time than in the third photoelectric conversion means.

30. A device according to claim 13, wherein, if an unfocused state is identified in the focus state detecting operation, in the calculation of said luminance information in said overlapping area of said photoelectric conversion means, each area for calculating said luminance information is regulated according to the defocus amount from the focused state.

31. A light metering device for use in a camera, also capable of focus state detection, comprising:

charge-accumulating photoelectric conversion means for effecting photoelectric conversion on a light beam from an area of an object field where focus state detection and light metering are possible;

luminance calculation means for calculating luminance information from the output of said charge-accumulating photoelectric conversion means;

area setting means for setting at least one of a first area for focus state detection and a second area for light metering, within said area where focus state detection and light metering are possible;

accumulation time control means for controlling the accumulation time of said charge-accumulating photoelectric conversion means;

accumulation time setting means for setting a first charge accumulation time optimum for obtaining luminance information from said first area set by said area setting means, and a second charge accumulation time optimum for obtaining luminance information from said second area set by said area setting means; and discrimination means for identifying the shorter one of said first and second charge accumulation times set by said accumulation time setting means.

32. A device according to claim 31, wherein said accumulation time control means controls the charge accumulation with the shorter one of said first and second charge accumulation times, identified by said discrimination means, thereby obtaining luminance information of all the areas of said charge-accumulating photoelectric conversion means.

33. A device according to claim 32, wherein, if the camera is set at a mode in which the exposure operation of the camera is not started until the phototaking lens reaches the in-focus position, said first charge accumulation time is adopted regardless of the result of identification by said discrimination means, thereby obtaining luminance information of all the areas of said charge-accumulating photoelectric conversion means and effecting the focus state detection at first.

34. A device according to claim 31, wherein the focus state detection is executed prior to the light metering if said first charge accumulation time is identified as shorter, and the light metering is executed prior to the focus state detection if said second charge accumulation time is identified as shorter.

35. A device according to claim 34, wherein, if the camera is set at a mode in which the exposure operation of the camera is not started until the phototaking lens reaches the in-focus position, said first charge accumulation time is adopted regardless of the result of identification by said discrimination means, thereby obtaining the luminance information in all the areas of said charge-accumulating photoelectric conversion means and effecting the focus state detection at first.

36. A light metering device, comprising:

first photoelectric conversion means for effecting photoelectric conversion on the light beam from a first area of an object field;

second photoelectric conversion means for effecting photoelectric conversion on the light beam from a second area, having a first overlapping area with said first area in the object field;

N units of photoelectric conversion means, each of which is represented as an n-th photoelectric conversion means for effecting photoelectric conversion on the light beam from an n-th area, having an (n−1)-th overlapping area with arbitrary one of the 1st to (n−1)-th areas in the object field, wherein N is an integer equal to or larger than 3, and n is an arbitrary integer satisfying a condition $2 \leq n \leq N$;

first luminance calculation means for calculating first luminance information from the output of said first photoelectric conversion means;

N units of luminance calculation means each of which is represented as an n-th luminance calculation means for calculating n-th luminance information from the output of said n-th photoelectric conversion means;

first luminance processing means for calculating a first overlapping area luminance in said first overlapping area of said first photoelectric conversion means, and a second overlapping area luminance in said first overlapping area of said second photoelectric conversion means;

(N−1) units of luminance processing means each of which is represented as an (n−1)-th luminance processing means for calculating a $\{(n \times 2)-3\}$-th overlapping area luminance in said (n−1)-th overlapping area of the non-n-th photoelectric conversion means having said (n−1)-th overlapping area, and the $\{(n \times 2)-2\}$-th overlapping area luminance in said (n−1)-th overlapping area of said n-th photoelectric conversion means; and light value calculation means for calculating light values in said 1st to N-th areas, utilizing the 1st to N-th luminance information obtained by said N units of luminance calculation means, and said 1st to $\{(N \times 2)-2\}$-th overlapping area luminances obtained by (N−1) units of luminance processing means.

37. A light metering device for use in a camera, comprising:

plural photoelectric conversion means adapted to effect photoelectric conversion on light beams from corresponding limited areas in an object field, wherein a part of one said limited area constitutes an overlapping area with a part of at least another said limited area;

luminance calculation means for calculating luminances of the object field in said overlapping area at different times, utilizing, at each time, the output for said overlapping area from a different photoelectric conversion means; and light value calculation means for calculating a light value of said overlapping area, utilizing the calculated luminances of the object field in said overlapping area.

38. A light metering device for use in a camera, comprising:

plural photoelectric conversion means adapted to effect photoelectric conversion on light beams from plural limited areas in an object field, wherein a part of one said limited area constitutes an overlapping area with a part of at least another said limited area;

luminance calculation means for calculating luminances of the object field in said overlapping area, utilizing respective outputs of a plurality of said photoelectric conversion means;

light value calculation means for calculating a light value of said overlapping area, utilizing the calculated luminances of the object field in said overlapping area;

ratio calculating means for calculating ratios of said light value and the calculated luminances of the object field in said overlapping area; and entire area luminance calculation means for calculating luminance of the object field over the entire area of each of said photoelectric conversion means having said overlapping area in the corresponding limited area, utilizing the corresponding ratio calculated by said ratio calculation means.

39. A light metering device for use in a camera, comprising:

plural photoelectric conversion means adapted to effect photoelectric conversion on light beams from plural limited areas in an object field, wherein one said limited area crosses another said limited area at a right angle to form a cross-shape having an overlapping area;

luminance calculation means for calculating luminances of the object field in said overlapping area, utilizing respective outputs of a plurality of said photoelectric conversion means; and light value calculation means for calculating a light value of said overlapping area, utilizing the calculated luminances of the object field in said overlapping area.

40. A device according to claim 39, wherein said luminance calculation means is adapted to calculate luminances of the object field in said overlapping area at different times, utilizing, at each time, the output for said overlapping area from a different photoelectric conversion means.

41. A device according to claim 39, further comprising:

ratio calculating means for calculating ratios of said light value and the calculated luminances of the object field in said overlapping area; and entire area luminance calculation means for calculating luminance of the object field over the entire area of each of said photoelectric conversion means having said overlapping area in the corresponding limited area, utilizing the corresponding ratio calculated by said ratio calculation means.

42. A light metering device for use in a camera, comprising:

plural photoelectric conversion devices adapted to effect photoelectric conversion on light beams from plural limited areas in an object field, one of said limited areas crossing another with an overlapping area;

luminance calculation means for calculating luminance of the object field in said overlapping area, utilizing an average of outputs, corresponding to said overlapping area, of said plural photoelectric conversion devices; and light value calculating means for calculating light values for areas in said plural limited areas extending outside said overlapping area, utilizing the calculated luminance of the object field in said overlapping area.

43. A light metering device comprising:

a first photoelectric converter which effects photoelectric conversion on a light beam coming from a first area of an object field;

a second photoelectric converter which effects photoelectric conversion on a light beam from a second area having an overlapping area with said first area in the object field;

a first luminance calculating section which calculates first luminance information, from the output of said first photoelectric converter;

a second luminance calculating section which calculates second luminance information, from the output of said second photoelectric converter;

a luminance processing section which calculates first overlapping area luminance in said overlapping area of said first photoelectric converter, and second overlapping area luminance in said overlapping area of said second photoelectric converter; and a light value calculating section which calculates light values in said first and second areas, utilizing, for each area, the corresponding luminance information and said first and second overlapping area luminances.

44. A light metering device comprising:

a first photoelectric converter which effects photoelectric conversion on a light beam from a first area of an object field;

a second photoelectric converter which effects photoelectric conversion on a light beam from a second area, having a first overlapping area with said first area in the object field;

a third photoelectric converter which effects photoelectric conversion on a light beam from a third area, having a second overlapping area with said second area in the object field;

a first luminance calculating section which calculates first luminance information, from the output of said first photoelectric converter;

a second luminance calculating section which calculates second luminance information, from the output of said second photoelectric converter;

a third luminance calculating section which calculates third luminance information, from the output of said third photoelectric converter;

a first luminance processing section which calculates a first overlapping area luminance in said first overlapping area of said first photoelectric converter and a second overlapping area luminance in said first overlapping area of said second photoelectric converter;

a second luminance processing section which calculates a third overlapping area luminance in said second overlapping area of said second photoelectric converter and a fourth overlapping area luminance in said second overlapping area of said third photoelectric converter; and a light value calculating section which calculates light values in said first, second and third areas, utilizing said first, second and third luminance information and said first, second, third and fourth overlapping area luminances.

45. A light metering device for use in a camera, also capable of focus state detection, comprising:

a charge-accumulating photoelectric converter which effects photoelectric conversion on a light beam from an area of an object field where focus state detection and light metering are possible;

a luminance calculating section which calculates luminance information from the output of said charge-accumulating photoelectric converter;

an area setting device which sets at least one of a first area for focus state detection and a second area for light metering, within said area where focus state detection and light metering are possible;

an accumulation time controlling section which controls the accumulation time of said charge-accumulating photoelectric converter;

an accumulation time setting section which sets a first charge accumulation time optimum for obtaining luminance information from said first area, and a second charge accumulation time optimum for obtaining luminance information from said second area; and a discriminating section which identifies the shorter one of said first and second charge accumulation times set by said accumulation time setting section.

46. A light metering device, comprising:

a first photoelectric converter which effects photoelectric conversion on a light beam from a first area of an object field;

a second photoelectric converter which effects photoelectric conversion on a light beam from a second area, having a first overlapping area with said first area in the object field;

N units of photoelectric converters, each of which is represented as an n-th photoelectric converter which effects photoelectric conversion on a light beam from an n-th area, having an (n−1)-th overlapping area with arbitrary one of the first to (n−1)-th areas in the object field, wherein N is an integer equal to or larger than 3, and n is an arbitrary integer satisfying a condition $2 \leq n \leq N$;

a first luminance calculating section which calculates first luminance information from the output of said first photoelectric converter;

N units of luminance calculating sections each of which is represented as an n-th luminance calculating section for calculating n-th luminance information from the output of said n-th photoelectric converter;

a first luminance processing section which calculates a first overlapping area luminance in said first overlapping area of said first photoelectric converter, and a second overlapping area luminance in said first overlapping area of said second photoelectric converter;

(N−1) units of luminance processing sections each of which is represented as an (n−1)-th luminance processing section which calculates a $\{(n \times 2)-3\}$-th overlapping area luminance in said (n−1)-th overlapping area of the non-n-th photoelectric converter having said (n−1)-th overlapping area, and the $\{(n \times 2)-2\}$-th overlapping area luminance in said (n−1)-th overlapping area of said n-th photoelectric converter; and a light value calculating section which calculates light values in said first to N-th areas, utilizing the first to N-th luminance information obtained by said N units of luminance calculating sections, and said first to $\{(N \times 2)-2\}$-th overlapping area luminances obtained by said (N−1) units of luminance processing sections.

47. A light metering device for use in a camera, comprising:

plural photoelectric converters adapted to effect photoelectric conversion on light beams from corresponding limited areas in an object field, wherein a part of one said limited area constitutes an overlapping area with a part of at least another said limited area;

a luminance calculating section which calculates luminances of the object field in said overlapping area at different times, utilizing, at each time, the output for said overlapping area from a different photoelectric converter; and a light value calculating section which calculates a light value of said overlapping area, utilizing the calculated luminances of the object field in said overlapping area.

48. A light metering device for use in a camera, comprising:

plural photoelectric converters adapted to effect photoelectric conversion on light beams from plural limited areas in an object field, wherein a part of one said limited area constitutes an overlapping area with a part of at least another said limited area;

a luminance calculating section which calculates luminances of the object field in said overlapping area, utilizing respective outputs of a plurality of said photoelectric converters;

a light value calculating section which calculates a light value of said overlapping area, utilizing the calculated luminances of the object field in said overlapping area;

a ratio calculating section which calculates ratios of said light value and the calculated luminances of the object field in said overlapping area; and an entire area luminance calculating section which calculates luminance of the object field over the entire area of each of said photoelectric converters having said overlapping area in the corresponding limited area, utilizing the corresponding ratio calculated by said ratio calculating section.

49. A light metering device for use in a camera, comprising:

plural photoelectric converters adapted to effect photoelectric conversion on light beams from plural limited areas in an object field, wherein one said limited area crosses another said limited area at a right angle to form a cross-shape having an overlapping area;

a luminance calculation section which calculates luminances of the object field in said overlapping area, utilizing respective outputs of a plurality of said photoelectric converters; and a light value calculating section which calculates a light value of said overlapping area, utilizing the calculated luminances of the object field in said overlapping area.

50. A light metering device for use in a camera, comprising:

plural photoelectric conversion devices adapted to effect photoelectric conversion on light beams from plural limited areas in an object field, one of said limited areas crossing another with an overlapping area;

a luminance calculating section which calculates luminance of the object field in said overlapping area, utilizing an average of outputs, corresponding to said overlapping area, of said plural photoelectric conversion devices; and a light value calculating section which calculates light values for areas in said plural limited areas extending outside said overlapping area, utilizing the calculated luminance of the object field in said overlapping area.

51. A light-metering and image-taking method comprising:

providing a first photoelectric converter which effects photoelectric conversion on a light beam coming from a first area of an object field;

providing a second photoelectric converter which effects photoelectric conversion on a light beam from a second area having an overlapping area with said first area in the object field;

calculating first luminance information, from the output of said first photoelectric converter;

calculating second luminance information, from the output of said second photoelectric converter;

calculating first overlapping area luminance in said overlapping area of said first photoelectric converter, and second overlapping area luminance in said overlapping area of said second photoelectric converter;

calculating light values in said first and second areas, utilizing, for each area, the corresponding luminance information and said first and second overlapping area luminances; and taking an image of an object in the object field based on at least one of said light values.

52. A light-metering and image-taking method comprising:

providing a first photoelectric converter which effects photoelectric conversion on a light beam from a first area of an object field;

providing a second photoelectric converter which effects photoelectric conversion on a light beam from a second area, having a first overlapping area with said first area in the object field;

providing a third photoelectric converter which effects photoelectric conversion on a light beam from a third area, having a second overlapping area with said second area in the object field;

calculating first luminance information, from the output of said first photoelectric converter;

calculating second luminance information, from the output of said second photoelectric converter;

calculating third luminance information, from the output of said third photoelectric converter;

calculating a first overlapping area luminance in said first overlapping area of said first photoelectric converter and a second overlapping area luminance in said first overlapping area of said second photoelectric converter;

calculating a third overlapping area luminance in said second overlapping area of said second photoelectric converter and a fourth overlapping area luminance in said second overlapping area of said third photoelectric converter;

calculating light values in said first, second and third areas, utilizing said first, second and third luminance information and said first, second, third and fourth overlapping area luminances; and taking an image of an object in the object field based on at least one of said light values.

53. A light-metering and focus state detecting method in a camera having a charge-accumulating photoelectric converter which effects photoelectric conversion on a light beam from an area of an object field where focus state detection and light metering are possible, said method comprising:

setting at least one of a first area for focus state detection and a second area for light metering, within said area where focus state detection and light metering are possible;

setting a first charge accumulation time optimum for obtaining luminance information from said first area, and a second charge accumulation time optimum for obtaining luminance information from said second area;

identifying the shorter one of said first and second charge accumulation times; and controlling said charge-accumulating photoelectric converter based on said shorter charge accumulation time for obtaining luminance information from said first and second areas.

54. A light-metering and image-taking method comprising:

providing a first photoelectric converter which effects photoelectric conversion on a light beam from a first area of an object field;

providing a second photoelectric converter which effects photoelectric conversion on a light beam from a second area, having a first overlapping area with said first area in the object field;

providing N units of photoelectric converters, each of which is represented as an n-th photoelectric converter which effects photoelectric conversion on a light beam from an n-th area, having an (n−1)-th overlapping area with arbitrary one of the first to (n−1)-th areas in the object field, wherein N is an integer equal to or larger than 3, and n is an arbitrary integer satisfying a condition $2 \leq n \leq N$;

providing N units of luminance calculating sections each of which is represented as an n-th luminance calculating section;

providing (N−1) units of luminance processing sections each of which is represented as an (n−1)-th luminance processing section;

calculating first luminance information from the output of said first photoelectric converter;

calculating with each of said luminance calculating sections corresponding n-th luminance information from the output of said n-th photoelectric converter;

calculating a first overlapping area luminance in said first overlapping area of said first photoelectric converter, and a second overlapping area luminance in said first overlapping area of said second photoelectric converter;

calculating with each luminance processing section a corresponding $\{(n \times 2)-3\}$-th overlapping area luminance in said (n−1)-th overlapping area of the non-n-th photoelectric converter having said (n−1)-th overlapping area, and the $\{(n \times 2)-2\}$-th overlapping area luminance in said (n−1)-th overlapping area of said n-th photoelectric converter;

calculating light values in said first to N-th areas, utilizing the first to N-th luminance information obtained by said N units of luminance calculating sections, and said first to $\{(N \times 2)-2\}$-th overlapping area luminances obtained by said (N−1) units of luminance processing sections; and taking an image of an object in the object field based on at least one of said light values.

55. A light-metering and image-taking method comprising:

providing plural photoelectric converters adapted to effect photoelectric conversion on light beams from corresponding limited areas in an object field, wherein a part of one said limited area constitutes an overlapping area with a part of at least another said limited area;

calculating luminances of the object field in said overlapping area at different times, utilizing, at each time, the output for said overlapping area from a different photoelectric converter;

calculating a light value of said overlapping area, utilizing the calculated luminances of the object field in said overlapping area; and taking an image of an object in the object field based on said light value.

56. A light-metering and image-taking method comprising:

providing plural photoelectric converters adapted to effect photoelectric conversion on light beams from plural limited areas in an object field, wherein a part of one said limited area constitutes an overlapping area with a part of at least another said limited area;

calculating luminances of the object field in said overlapping area, utilizing respective outputs of a plurality of said photoelectric converters;

calculating a light value of said overlapping area, utilizing the calculated luminances of the object field in said overlapping area;

calculating ratios of said light value and the calculated luminances of the object field in said overlapping area;

calculating luminance of the object field over the entire area of each of said photoelectric converters having said overlapping area in the corresponding limited area, utilizing the corresponding ratio calculated by said ratio calculating section; and taking an image of an object in the object field based on the calculated luminance of the object field over at least one said entire area.

57. A light-metering and image-taking method comprising:

providing plural photoelectric converters adapted to effect photoelectric conversion on light beams from plural limited areas in an object field, wherein one said limited area crosses another said limited area at a right angle to form a cross-shape having an overlapping area;

calculating luminances of the object field in said overlapping area, utilizing respective outputs of a plurality of said photoelectric converters;

calculating a light value of said overlapping area, utilizing the calculated luminances of the object field in said overlapping area; and taking an image of an object in the object field based on said light value.

58. A light-metering and image-taking method comprising:

providing plural photoelectric conversion devices adapted to effect photoelectric conversion on light beams from plural limited areas in an object field, one of said limited areas crossing another with an overlapping area;

calculating luminance of the object field in said overlapping area, utilizing an average of outputs, corresponding to said overlapping area, of said plural photoelectric conversion devices;

calculating light values for areas in said plural limited areas extending outside said overlapping area, utilizing the calculated luminance of the object field in said overlapping area; and taking an image of an object in the object field based on said light values.

59. A light metering device for use in a camera, also capable of focus state detection, comprising:

a charge-accumulating photoelectric converter which effects photoelectric conversion on a light beam from an area of an object field where focus state detection and light metering are possible;

an accumulation time setting section which sets a first charge accumulation time optimum for focus state detection, and a second charge accumulation time optimum for light metering; and an accumulation time controlling section which controls the accumulation time of said charge-accumulating photoelectric converter with the shorter one of said first and second charge accumulation times set by said accumulation time setting section.

60. A light metering device according to claim 59, wherein, when a phototaking lens is to be driven to an in-focus position before an exposure operation of the camera, said accumulation time controlling section controls the accumulation time of said charge-accumulating photoelectric converter with said first charge accumulation time.

61. A light metering device for use in a camera, also capable of focus state detection, comprising:

a charge-accumulation photoelectric converter which effects photoelectric conversion on a light beam from an area of an object field where focus state detection and light metering are possible;

an area setting section which sets, within said area of the object field where focus state detection and light metering are possible, a first area in which focus state detection is conducted and a second area in which light metering is conducted; and an accumulation time controlling section which, when a phototaking lens is to be driven to an in-focus position before an exposure operation of the camera, controls the accumulation time of said charge-accumulating photoelectric converter with a first charge accumulation time which is optimum for obtaining luminance information from said first area set by said area setting section.

* * * * *